US012715949B2

(12) United States Patent
Hayashi et al.

(10) Patent No.: US 12,715,949 B2
(45) Date of Patent: Aug. 25, 2026

(54) CURABLE COMPOSITION FOR STEREOLITHOGRAPHY, EVAPORATIVE PATTERN, AND METHOD FOR PRODUCING THREE-DIMENSIONAL ARTICLE

(71) Applicant: MITSUI CHEMICALS, INC., Tokyo (JP)

(72) Inventors: Takaaki Hayashi, Funabashi (JP); Toshikazu Sakamaki, Tokyo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 393 days.

(21) Appl. No.: 16/970,523

(22) PCT Filed: Mar. 28, 2019

(86) PCT No.: PCT/JP2019/013778

§ 371 (c)(1),
(2) Date: Aug. 17, 2020

(87) PCT Pub. No.: WO2019/189652

PCT Pub. Date: Oct. 3, 2019

(65) Prior Publication Data

US 2020/0377637 A1 Dec. 3, 2020

(30) Foreign Application Priority Data

Mar. 30, 2018 (JP) ................................ 2018-069092
Mar. 30, 2018 (JP) ................................ 2018-069093
Nov. 29, 2018 (JP) ................................ 2018-223467

(51) Int. Cl.
*C08F 255/02* (2006.01)
*B29C 64/124* (2017.01)
(Continued)

(52) U.S. Cl.
CPC .......... *C08F 255/02* (2013.01); *B29C 64/124* (2017.08); *B33Y 10/00* (2014.12); *B33Y 70/00* (2014.12); *B29K 2033/12* (2013.01)

(58) Field of Classification Search
CPC ....... C08F 255/02; B33Y 10/00; B33Y 70/00; B29C 64/124; B29K 2033/12
See application file for complete search history.

(56) References Cited

U.S. PATENT DOCUMENTS

2014/0364531 A1 12/2014 Ito et al.
2016/0326387 A1 11/2016 Arita et al.
(Continued)

FOREIGN PATENT DOCUMENTS

EP 2 636 511 A1 9/2013
EP 3254667 A1 12/2017
(Continued)

OTHER PUBLICATIONS

English language translation of WO 2015/099022 (Year: 2015).*
(Continued)

*Primary Examiner* — Larry W Thrower
(74) *Attorney, Agent, or Firm* — BUCHANAN INGERSOLL & ROONEY PC

(57) ABSTRACT

A curable composition for stereolithography, comprising a photopolymerizable component and a photopolymerization initiator, wherein a cured product of the curable composition has a minimum value of a storage elastic modulus, in a range of from 25° C. to 300° C., of not greater than $1.20\times10^7$ Pa.

17 Claims, 1 Drawing Sheet

(51) Int. Cl.
*B33Y 10/00* (2015.01)
*B33Y 70/00* (2020.01)
*B29K 33/00* (2006.01)

(56) References Cited

U.S. PATENT DOCUMENTS

2017/0015850 A1* 1/2017 Yoshino ............... C09D 11/107
2017/0252971 A1 9/2017 Umebayashi
2018/0037758 A1 2/2018 Ishikawa et al.
2019/0009453 A1 1/2019 Kitou et al.

FOREIGN PATENT DOCUMENTS

JP 2015038166 A 2/2015
JP 2016-020429 A 2/2016
JP 2017-31249 A 2/2017
JP 6271772 B2 1/2018
JP 2018039962 A 3/2018
WO WO215099022 * 7/2015
WO WO-2017066077 A1 * 4/2017 ........... B24D 11/001

OTHER PUBLICATIONS

International Search Report (PCT/ISA/210) issued on May 21, 2019, by the Japan Patent Office as the International Searching Authority for International Application No. PCT/JP2019/013778.
Written Opinion (PCT/ISA/237) issued on May 21, 2019, by the Japan Patent Office as the International Searching Authority for International Application No. PCT/JP2019/013778.

* cited by examiner

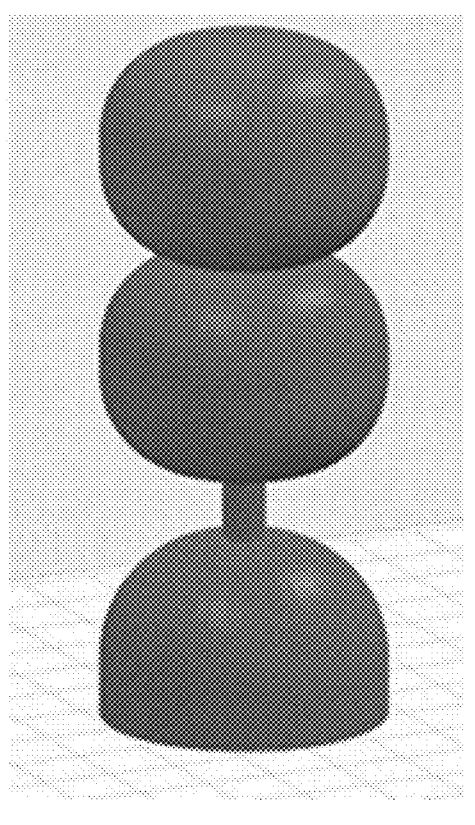

CURABLE COMPOSITION FOR STEREOLITHOGRAPHY, EVAPORATIVE PATTERN, AND METHOD FOR PRODUCING THREE-DIMENSIONAL ARTICLE

TECHNICAL FIELD

The disclosure relates to a curable composition for stereolithography, an evaporative pattern, and a method for producing a three-dimensional article.

BACKGROUND ART

Recently, photo-curable resins are being used as a raw material for obtaining a three-dimensional article by photolithography using a 3D printer or the like. Articles obtained by stereolithography from a photo-curable resin are used in various applications. For example, Patent Document 1 proposes the use of a stereolithographic article as an evaporative pattern for producing a plaster mold for an artificial denture by evaporative pattern casting, in a technique in which the article is eliminated by heating while being covered with a plaster or the like.

PRIOR ART DOCUMENT

Patent Document

Patent Document 1: Japanese Patent No. 6271772

SUMMARY OF THE INVENTION

In the technique of evaporative pattern casting, the stereolithographic article used as an evaporative pattern needs to be heated at a high temperature in order to eliminate the same. When the cured product of a curable composition as described in Patent Document 1 is heated by rapidly increasing the temperature, cracking of the material around the cured product (such as plaster) may be caused by volume expansion of the cured product. In such a case, the rate of increasing the temperature needs to be controlled to a moderate rate.

On the other hand, when the temperature is increased moderately in order to suppress the volume expansion of the cured product, productivity is lowered due to the extended time required for the casting process. Accordingly, development of a material that is suitable for the production of an evaporative pattern, which is less susceptible to cracking of a material disposed around the same when the casting is performed with a rapid rate of temperature increase, is demanded.

In view of the circumstances described above, an embodiment of the invention aims to provide a curable composition for stereolithography, which is capable of forming a cured product with suppressed cracking of a material disposed around the same during heating at a rapid pace of temperature increase. Another embodiment of the invention is to provide an evaporative pattern, which is a cured product of the curable composition. Yet another embodiment of the invention is to provide a method of producing a three-dimensional article by using the curable composition.

Means for Solving the Problem

The means for solving the problem include the following embodiments.

<1> A curable composition for stereolithography, comprising a photopolymerizable component and a photopolymerization initiator, wherein a cured product of the curable composition has a minimum value of a storage elastic modulus, in a range of from 25° C. to 300° C., of not greater than $1.20\times10^7$ Pa.

<2> The curable composition for stereolithography according to claim 1, wherein the cured product of the curable composition has a minimum value of a storage elastic modulus, in a range of from 75° C. to 200° C., of not greater than $1.20\times10^7$ Pa.

<3> The curable composition for stereolithography according to <1> or <2>, wherein the cured product of the curable composition has a storage elastic modulus, at 25° C., of greater than $1.0\times10^9$ Pa.

<4> The curable composition for stereolithography according to any one of <1> to <3>, comprising a (meth)acryloyl group at a content of from $1.0\times10^{-3}$ mol/g to $6.5\times10^{-3}$ mol/g.

<5> The curable composition for stereolithography according to any one of <1> to <4>, wherein the photopolymerizable component comprises a (meth)acrylic monomer having an alicyclic structure.

<6> The curable composition for stereolithography according to any one of <1> to <5>, wherein the photopolymerizable component comprises a (meth)acrylic monomer having a glass transition temperature (Tg), in a state of a cured product, of not greater than 60° C.

<7> The curable composition for stereolithography according to any one of <1> to <6>, wherein the photopolymerizable component comprises a monofunctional (meth)acrylic monomer.

<8> The curable composition for stereolithography according to <7>, wherein the monofunctional (meth)acrylic monomer comprises a monofunctional (meth)acrylic monomer having an alicyclic structure.

<9> The curable composition for stereolithography according to any one of <1> to <8>, wherein the photopolymerizable component comprises a monofunctional (meth)acrylic monomer having a glass transition temperature (Tg), in a state of a cured product, of greater than 60° C., and having an alicyclic structure.

<10> The curable composition for stereolithography according to <7> or <8>, wherein the photopolymerizable component further comprises a difunctional (meth)acrylic monomer.

<11> The curable composition for stereolithography according to <10>, wherein a mass ratio of the monofunctional (meth)acrylic monomer to the difunctional (meth)acrylic monomer is from 1:0.1 to 1:0.8.

<12> The curable composition for stereolithography according to any one of <1> to <3>, wherein the photopolymerizable component comprises a monofunctional (meth)acrylic monomer having an alicyclic structure and a difunctional (meth)acrylate, and the curable composition comprises a polyalkylene glycol.

<13> The curable composition for stereolithography according to any one of <1> to <11>, further comprising an alcohol or an alcohol derivative.

<14> The curable composition for stereolithography according to <13>, wherein the alcohol or the alcohol derivative comprises a compound having a structure represented by the following Formula (3):

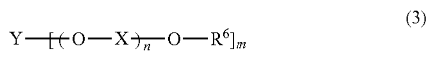

(3)

wherein, in Formula (3), $R^6$ represents a hydrogen atom or a hydrocarbon group of 1 to 20 carbon atoms that may have a substituent; X represents a divalent hydrocarbon group of 1 to 6 carbon atoms; Y represents a hydrocarbon group with a valency of m of 1 to 20 carbon atoms; n represents an integer of 0 to 300; m represents an integer of 1 to 8; when the number of X is two or more, the two or more of X may be the same as or different from each other; and when the number of $R^6$ is two or more, the two or more of $R^6$ may be the same as or different from each other.

<15> The curable composition for stereolithography according to <13> or <14>, wherein a content of the alcohol or the alcohol derivative with respect to 100 parts by mass of the curable composition is from 5 parts by mass to less than 60 parts by mass.

<16> A curable composition for stereolithography, comprising a photopolymerizable component, an alcohol or an alcohol derivative, and a photopolymerization initiator, the curable composition satisfying at least one of the following (1) or (2):

(1) a content of a (meth)acryloyl group is not greater than $6.5\times10^{-3}$ mol/g; or (2) the photopolymerizable component comprises a monofunctional (meth)acrylic monomer.

<17> The curable composition for stereolithography according to any one of <1> to <16>, comprising a thermoplastic component.

<18> The curable composition for stereolithography according to <17>, wherein the thermoplastic component comprises a hydrocarbon polymer.

<19> The curable composition for stereolithography according to <17> or <18>, wherein the content of the (meth)acryloyl group is from $1.0\times10^{-3}$ mol/g to $5.1\times10^{-3}$ mol/g.

<20> The curable composition for stereolithography according to any one of <1> to <19>, which is used as an evaporative pattern for evaporative pattern casting.

<21> An evaporative pattern, comprising a cured product of the curable composition for stereolithography according to any one of <1> to <20>.

<22> A method of producing a three-dimensional article, the method comprising:

a process of disposing a material for the three-dimensional article around a cured product, which is obtained from the curable composition for stereolithography according to any one of <1> to <20>; and a process of eliminating the cured product by heating.

Effect of the Invention

According to the invention, a curable composition for stereolithography, which is capable of forming a cured product with suppressed cracking of a material disposed around the same during heating at a rapid pace of temperature increase, is provided. Further, an evaporative pattern, which is a cured product of the curable composition, and a method of producing a three-dimensional article by using the curable composition, are provided.

BRIEF DESCRIPTION OF THE DRAWING

FIG. 1 is a perspective view illustrating the shape of an evaporative pattern used for a heating test.

EMBODIMENTS FOR IMPLEMENTING THE INVENTION

<Curable Composition for Stereolithography>

The curable composition for stereolithography of a first embodiment according to the disclosure is a curable composition for stereolithography, wherein a cured product of the curable composition has a minimum value of a storage elastic modulus, in a range of from 25° C. to 300° C., of not greater than $1.20\times10^7$ Pa.

The curable composition for stereolithography of a second embodiment according to the disclosure is a curable composition for stereolithography, comprising a photopolymerizable component, an alcohol or an alcohol derivative, and a photopolymerization initiator, and comprising a (meth)acryloyl group at a content of not greater than $6.5\times10^{-3}$ mol/g.

The curable composition for stereolithography of a third embodiment according to the disclosure is a curable composition for stereolithography, comprising a photopolymerizable component, an alcohol or an alcohol derivative, and a photopolymerization initiator, the photopolymerizable component comprising a monofunctional (meth)acrylic monomer.

The curable composition for stereolithography of a fourth embodiment according to the disclosure is a curable composition for stereolithography, comprising a photopolymerizable component, a thermoplastic component, and a photopolymerization initiator, the photopolymerizable component comprising a monofunctional (meth)acrylic monomer.

The curable composition for stereolithography of a fifth embodiment according to the disclosure is a curable composition for stereolithography, comprising a photopolymerizable component, a thermoplastic component, and a photopolymerization initiator, and comprising a (meth)acryloyl group at a content of not greater than $5.1\times10^{-3}$ mol/g.

The curable composition for stereolithography of a sixth embodiment according to the disclosure is a curable composition for stereolithography, comprising a photopolymerizable component and a photopolymerization initiator, the photopolymerizable component comprising a (meth)acrylic monomer having a glass transition temperature (Tg), in a state of a cured product, of not greater than 60° C.

The curable composition of respective embodiments may satisfy the conditions that is defined in a different embodiment. For example, the curable composition of the first embodiment may satisfy the conditions defined in the curable composition of any one of the second to sixth embodiments.

In the disclosure, "(meth)acrylic" refers to acrylic or methacrylic, and "(meth)acryloyl" refers to acryloyl or methacryloyl.

As a result of intensive studies, the inventors have found that a cured product, obtained from the curable composition for stereolithography of the first to sixth embodiments, is less susceptible to cracking of a material disposed around the same, even under a rapid rate of temperature increase, thereby achieving the invention. In the disclosure, the curable composition for stereolithography may be simply referred to as a curable composition.

The reason why cracking of a material disposed around a cured product obtained from the curable composition of the first to sixth embodiments is suppressed under a rapid rate of temperature increase is not exactly clear, but may be considered as follows, for example.

In a case of the cured composition of the first embodiment, since a cured product thereof has a minimum value of a storage elastic modulus, in a range of from 25° C. to 300° C., of not greater than $1.20\times10^7$ Pa, a stress generated by volume expansion of the cured product is relaxed, whereby cracking of a material around the cured product is suppressed.

In a case of the cured composition of the second embodiment, it is considered that an alcohol or an alcohol derivative included therein is softened by heating, and a stress generated by volume expansion of the cured product is relaxed. In addition, since the content of a (meth)acryloyl group is not greater than $6.5\times10^{-3}$ mol/g, the crosslinkage density of the cured product is not too high and a stress generated by volume expansion of the cured product is further relaxed.

In a case of the cured composition of the third embodiment, it is considered that an alcohol or an alcohol derivative included therein is softened by heating, and a stress generated by volume expansion of the cured product is relaxed. In addition, since the curable composition includes a monofunctional (meth)acrylic monomer as a photopolymerizable compound, the crosslinkage density of the cured product is not too high and a stress generated by volume expansion of the cured product is further relaxed.

In a case of the cured composition of the fourth embodiment, it is considered that a thermoplastic component included therein is softened by heating, and a stress generated by volume expansion of the cured product is relaxed. In addition, since the curable composition includes a monofunctional (meth)acrylic monomer as a photopolymerizable compound, the crosslinkage density of the cured product is not too high and a stress generated by volume expansion of the cured product is further relaxed.

In a case of the cured composition of the fifth embodiment, it is considered that a thermoplastic component included therein is softened by heating, and a stress generated by volume expansion of the cured product is relaxed. In addition, since the content of a (meth)acryloyl group is not greater than $5.1\times10^{-3}$ mol/g, the crosslinkage density of the cured product is not too high and a stress generated by volume expansion of the cured product is further relaxed.

In a case of the cured composition of the sixth embodiment, it is considered that a (meth)acrylic monomer having a glass transition temperature (Tg), in a state of a cured product, of not greater than 60° C. included therein is softened by heating, and a stress generated by volume expansion of the cured product is relaxed.

(Storage Elastic Modulus of Cured Product)

The curable composition preferably has a minimum value of a storage elastic modulus of a cured product thereof, in a range of from 25° C. to 300° C., of not greater than $1.20\times10^7$ Pa, more preferably not greater than $1.08\times10^7$ Pa, further preferably not greater than $1.00\times10^7$ Pa, yet further preferably not greater than $9.0\times10^6$ Pa.

When a cured product that satisfies the conditions as described above is heated, a stress generated therein due to volume expansion is effectively relaxed. Therefore, when the cured product is used as an evaporative pattern for evaporative pattern casting, cracking of a mold disposed around the evaporative pattern is effectively suppressed.

From the viewpoint of improving the accuracy of a product, which is obtained by evaporative pattern casting using the curable composition, the minimum value of a storage elastic modulus of a cured product thereof, in a range of from 25° C. to 300° C., is preferably as low as possible.

When the curable composition includes a thermoplastic component, the minimum value of a storage elastic modulus of a cured product thereof, in a range of from 25° C. to 300° C., is preferably not greater than $5.45\times10^6$ Pa.

When the curable composition includes an alcohol or an alcohol derivative, or a (meth)acrylic monomer having a glass transition temperature (Tg), in a state of a cured product, of not greater than 60° C., the minimum value of a storage elastic modulus of a cured product thereof, in a range of from 25° C. to 300° C., is preferably not greater than $8.00\times10^6$ Pa.

The lower limit of the storage elastic modulus of a cured product of the curable composition, in a range of from 25° C. to 300° C., is not particularly limited. For example, the minimum value of the storage elastic modulus of a cured product of the curable composition, in a range of from 25° C. to 300° C., may be not less than $1.0\times10^4$ Pa, or not less than $1.0\times10^5$ Pa, or not less than $1.0\times10^6$ Pa.

The curable composition preferably has a minimum value of a storage elastic modulus of a cured product thereof, in a range of from 75° C. to 200° C., within the ranges as described above.

From the viewpoint of handleability of the curable composition and the accuracy of an article obtained from the curable composition, the storage elastic modulus of a cured product of the curable composition at ordinary temperature (25° C.) is preferably as high as possible. For example, the storage elastic modulus of a cured product of the curable composition at 25° C. is preferably greater than $1.0\times10^9$ Pa, more preferably greater than $1.2\times10^9$ Pa, further preferably greater than $1.4\times10^9$ Pa. The storage elastic modulus of a cured product of the curable composition at 25° C. may be not greater than $5.0\times10^9$ Pa.

The lower limit of the storage elastic modulus of a cured product of the curable composition may be adjusted by, for example, adding a component such as an alcohol or an alcohol derivative, a thermoplastic component, or a (meth) acrylic monomer having a glass transition temperature (Tg), in a state of a cured product, of not greater than 60° C. as a photopolymerizable component.

For example, it is possible to decrease the minimum value of the storage elastic modulus of a cured product of the curable composition by increasing the amount of these components, or it is possible to increase the minimum value of the storage elastic modulus of a cured product of the curable composition by decreasing the amount of these components.

The minimum value of the storage elastic modulus of a cured product of the curable composition is measured by a method as described in the Examples.

(Content of (Meth)Acryloyl Group)

The content of a (meth)acryloyl group in the curable composition according to the disclosure refers to the amount of a (meth)acryloyl group per mass of the curable composition (mol/g). From the viewpoint of relaxing a stress generated due to volume expansion of a cured product, the content of a (meth)acryloyl group in the curable composition may be, for example, not greater than $6.7\times10^{-3}$ mol/g, or not greater than $6.5\times10^{-3}$ mol/g.

When the curable composition includes an alcohol or an alcohol derivative, the content of a (meth)acryloyl group may be not greater than $6.6\times10^{-3}$ mol/g, or not greater than $6.5\times10^{-3}$ mol/g.

When the curable composition includes a thermoplastic component, the content of a (meth)acryloyl group is preferably not greater than $5.1\times10^{-3}$ mol/g.

When the curable composition includes a (meth)acrylic monomer having a glass transition temperature (Tg), in a state of a cured product, of not greater than 60° C. as a photopolymerizable component, the content of a (meth) acryloyl group is preferably not greater than $6.0\times10^{-3}$ mol/g.

From the viewpoint of achieving sufficient curability, the content of a (meth)acryloyl group of the curable composition may be not less than $0.5\times10^{-3}$ mol/g, preferably not less than $1.0\times10^{-3}$ mol/g, more preferably not less than $2.0\times10^{-3}$ mol/g.

(Photopolymerizable Component)

The photopolymerizable component, which may be included in the curable composition, may be a (meth)acrylic monomer, for example.

The type of the (meth)acrylic monomer is not particularly limited, and may be a monofunctional (meth)acrylic monomer (a monomer having one (meth)acryloyl group in one molecule), a difunctional (meth)acrylic monomer (a monomer having two (meth)acryloyl groups in one molecule), or a polyfunctional (meth)acrylic monomer (a monomer having three or more (meth)acryloyl groups in one molecule).

From the viewpoint of relaxing a stress generated due to volume expansion of a cured product, the curable composition preferably includes a monofunctional (meth)acrylic monomer.

From the viewpoint of improving the smoothness of a surface of a cured product, and improving the accuracy of an article obtained from the curable composition, the curable composition preferably includes a difunctional (meth) acrylic monomer.

From the viewpoint of achieving a smooth surface of a cured product, the curable composition preferably includes an acrylic monomer, rather than a methacrylic monomer.

From the viewpoint of improving the smoothness of a surface of a cured product, dimensional accuracy of a cured product, and the accuracy of an evaporative pattern, the curable composition preferably includes a (meth)acrylic monomer having an alicyclic structure, more preferably a monofunctional (meth)acrylic monomer having an alicyclic structure, as a photopolymerizable component.

Specific examples of the alicyclic structure included in the (meth)acrylic monomer include a structure having a monovalent alicyclic group, such as a cyclopropyl group, a cyclobutyl group, a cyclohexyl group, a cycloheptyl group, a cyclooctyl group, a cubanyl group, a norbornyl group, an isobornyl group, a tetrahydrodicyclopentadienyl group, an adamanthyl group, a diadamantyl group, a bicyclo[2.2.2] octyl group, a decahydronaphthyl group, and a morpholin-4-yl group; and a structure having a divalent alicyclic group corresponding to the monovalent alicyclic group as mentioned above.

In the disclosure, an alicyclic structure having a hetero atom (such as an oxygen atom or a nitrogen atom) is regarded as the "alicyclic structure".

Specific examples of the monofunctional (meth)acrylic monomer include a compound represented by the following Formula (1) and a compound represented by the following Formula (4).

(1)

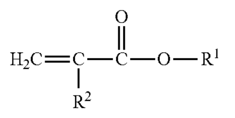

-continued (4)

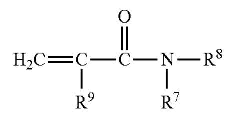

In Formula (1), $R^1$ represents a monovalent hydrocarbon group of 1 to 40 carbon atoms or a monovalent hydrocarbon group of 1 to 40 carbon atoms from which a part of the carbon atom is substituted by an oxygen atom or a nitrogen atom, which may have a substituent; and $R^2$ represents a hydrogen atom or a methyl group. The monovalent hydrocarbon group of 1 to 40 carbon atoms represented by $R^1$ may include an unsaturated double bond, or may not include an unsaturated double bond.

Examples of the monovalent hydrocarbon group of 1 to 40 carbon atoms or the monovalent hydrocarbon group of 1 to 40 carbon atoms from which a part of the carbon atom is substituted by an oxygen atom or a nitrogen atom, represented by $R^1$, include an alkyl group, an aryl group, a group derived from a cyclic ether compound, a group having an urethane bond, or a combination of these groups, of 1 to 40 carbon atoms. The alkyl group may have a linear, branched or cyclic form. The hydrocarbon group preferably has a cyclic structure. The carbon number of the hydrocarbon group represented by $R^1$ is preferably from 1 to 22, more preferably from 4 to 12.

The monovalent hydrocarbon group having 1 to 40 carbon atoms, represented by $R^1$, may have a substituent or may not have a substituent (unsubstituted). Examples of the substituent include a halogen atom, an amino group, a hydroxy group, a carboxy group, and an epoxy group. When the substituent includes a carbon atom, the carbon number of the hydrocarbon group does not include the carbon atom in the substituent.

In Formula (4), each of $R^7$ and $R^8$ independently represents a monovalent hydrocarbon group of 1 to 40 carbon atoms or a monovalent hydrocarbon group of 1 to 40 carbon atoms from which a part of the carbon atom is substituted by an oxygen atom or a nitrogen atom, which may have a cyclic structure; $R^9$ represents a hydrogen atom or a methyl group; and $R^7$ and $R^8$ may be bonded together to form a ring. The monovalent hydrocarbon group of 1 to 40 carbon atoms represented by $R^7$ and $R^8$ may include an unsaturated double bond, or may not include an unsaturated double bond.

Examples of the monovalent hydrocarbon group of 1 to 40 carbon atoms or the monovalent hydrocarbon group of 1 to 40 carbon atoms from which a part of the carbon atom is substituted by an oxygen atom or a nitrogen atom, represented by $R^7$ and $R^8$, include an alkyl group, an aryl group, a group derived from a cyclic ether group, a heteroaryl group, or a combination thereof, of 1 to 40 carbon atoms. The alkyl group may have a linear, branched or cyclic form. The carbon number of the hydrocarbon group represented by $R^7$ and $R^8$ is preferably from 1 to 22, more preferably from 4 to 12. The hydrocarbon group is preferably an alkyl group of 2 to 6 carbon atoms or a hydrocarbon group having a cyclic group. Particularly preferably, $R^7$ and $R^8$ are bonded together to form a ring. When $R^7$ and $R^8$ are bonded together to form a ring, the ring is preferably a hetero ring of 4 to 12 carbon atoms that includes a nitrogen atom, or a hetero ring of 4 to 12 carbon atoms that includes a nitrogen atom and an oxygen atom. When either one of $R^7$ or $R^8$ is an alkyl group of 2 to 6 carbon atoms, the other one is preferably a hydrogen atom. When $R^7$ or $R^8$ is an alkyl group of 2 to 6 carbon atoms, a part of the carbon atom is preferably substituted by an oxygen atom.

The monovalent hydrocarbon group of 1 to 40 carbon atoms represented by $R^7$ and $R^8$ may independently have a substituent or may not have a substituent (unsubstituted). Examples of the substituent include a halogen atom, an amino group, a hydroxy group, a carboxy group and an epoxy group. When the substituent includes a carbon atom, the carbon number of the hydrocarbon group does not include the carbon atom of the substituent. When $R^7$ or $R^8$ is an alkyl group, the alkyl group preferably has a hydroxy group as a substituent.

Specific examples of the monovalent (meth)acrylic monomer include cyclohexyl (meth)acrylate, isobornyl (meth) acrylate, dicyclopentanyl (meth)acrylate, dicyclopentenyl (meth)acrylate, 4-tert-butylcyclohexyl (meth)acrylate, tetrahydrofurfuryl (meth)acrylate, (2-methyl-2-ethyl-2,3-dioxoran-4-yl)methyl (meth)acrylate, cyclic trimethylolpropanformal (meth)acrylate, 4-(meth)acryloyl morpholine, lauryl (meth)acrylate, 4-hydroxybutyl (meth)acrylate, 2-hydroxyethyl (meth)acrylate, phenoxyethylene glycol (meth)acrylate, 2-dodecyl-1-hexadecanyl (meth)acrylate, 2-(meth) acryloyloxyethyl succinate, 2-[[(butylamino)carbonyl]oxy] ethyl (meth)acrylate, and 2-(2-ethoxyethoxy)ethyl (meth) acrylate.

Specific examples of the difunctional (meth)acrylic monomer include a compound represented by the following Formula (2).

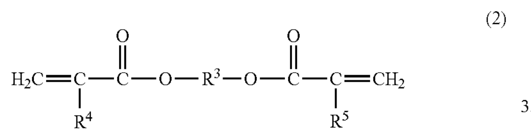

(2)

In Formula (2), $R^3$ represents a divalent hydrocarbon group of 1 to 40 carbon atoms or a divalent hydrocarbon group of 1 to 40 carbon atoms from which a part of the carbon atom is substituted by an oxygen atom or a nitrogen atom, which may have a substituent; and each of $R^4$ and $R^5$ independently represents a hydrogen atom or a methyl group. The hydrocarbon group of 1 to 40 carbon atoms represented by $R^3$ may include an unsaturated double bond, or may not include an unsaturated double bond.

Examples of the divalent hydrocarbon group of 1 to 40 carbon atoms or the divalent hydrocarbon group of 1 to 40 carbon atoms from which a part of the carbon atom is substituted by an oxygen atom or a nitrogen atom, represented by $R^3$, include an alkylene group, an arylene group, an alkylene oxide group, a group having an urethane bond, and a combination of these groups, of 1 to 40 carbon atoms. The alkylene group may have a linear, branched or cyclic form. The carbon number of the hydrocarbon group represented by $R^3$ is preferably from 1 to 22, more preferably from 1 to 16, further preferably from 4 to 12.

The divalent hydrocarbon group of 1 to 40 carbon atoms represented by $R^3$ may have a substituent or may not have a substituent (unsubstituted). Examples of the substituent include a halogen atom, an amino group, a hydroxy group, a carboxy group and an epoxy group. When the hydrocarbon group includes a carbon atom, the carbon number of the hydrocarbon group does not include the carbon atom of the substituent.

Specific examples of the difunctional (meth)acrylic monomer include ethylene glycol di(meth)acrylate, tri ethylene glycol di(meth)acrylate, glycerin di(meth)arylate, 1,6-hexanediol di(meth)acrylate, ethoxylated bisphenol A di(meth)acrylate, dimethylol-tricyclodecane di(meth)acrylate, 1,9-nonanediol di(meth)acrylate, dioxane glycol di(meth)acrylate, diethylene glycol di(meth)acrylate, dipropylene glycol di(meth)acrylate, ethoxylated hydrogenated bisphenol A di(meth)acrylate, 2-hydroxy-3-acryloyloxypropyl (meth)acrylate, bis(2-methacryloyloxyethyl) N,N'-1,9-nonylene biscarbamate (diurethane di(meth)acrylate), polyethylene glycol di(meth)acrylate, and polypropylene glycol di(meth)acrylate.

From the viewpoint of improving the smoothness of a surface of a cured product, the dimensional accuracy of a cured product, and the accuracy of an evaporative pattern, the curable composition preferably includes a (meth)acrylic monomer having a glass transition temperature (Tg), in a state of a cured product, of greater than 60° C., more preferably a monovalent (meth)acrylic monomer having a Tg, in a state of a cured product, of greater than 60° C.

From the viewpoint of relaxing a stress generated by volume expansion of a cured product, the curable composition preferably includes a (meth)acrylic monomer having a Tg, in a state of a cured product, of not greater than 60° C., more preferably a (meth)acrylic monomer having a Tg, in a state of a cured product, of not greater than 30° C., further preferably a (meth)acrylic monomer having a Tg, in a state of a cured product, of not greater than 0° C.

From the viewpoint of achieving the improvement in smoothness of a surface of a cured product, dimensional accuracy of a cured product, and accuracy of evaporative pattern casting, and the relaxation of a stress generated due to volume expansion of a cured product, the curable composition preferably includes a (meth)acrylic monomer having a Tg, in a state of a cured product, of not greater than 60° C. and a (meth)acrylic monomer having a Tg, in a state of a cured product, of greater than 60° C., in combination; more preferably a (meth)acrylic monomer having a Tg, in a state of a cured product, of not greater than 60° C. and a monovalent (meth)acrylic monomer having a Tg, in a state of a cured product, of greater than 60° C., in combination.

In the disclosure, the Tg in a state of a cured product of a (meth)acrylic monomer refers to a Tg of a cured product obtained from the (meth)acrylic monomer alone as a phosopolymerizable component.

Examples of the monovalent (meth)acrylic monomer having a Tg, in a state of a cured product, of not greater than 60° C. include lauryl (meth)acrylate, 4-hydroxybutyl (meth) acrylate, phenoxyethylene (meth)acrylate, 2-dodecyl-1-hexadecanyl (meth)acrylate, 2-hydroxyethyl (meth)acrylate, 2-(meth)acryloyloxyethyl succinate, 2-[[(butylamino)carbonyl]oxy]ethyl (meth)acrylate, 2-(2-ethoxyethoxy)ethyl (meth)acrylate, and tetrahydrofurfuryl (meth)acrylate.

Examples of the divalent (meth)acrylic monomer having a Tg, in a state of a cured product, of not greater than 60° C. include polyethylene glycol diacrylate, polypropylene glycol diacrylate, and ethoxylated bisphenol A di(meth)acrylate.

Examples of the divalent (meth)acrylic monomer having a Tg, in a state of a cured product, of greater than 60° C. include cyclohexyl (meth)acrylate, isobornyl (meth)acrylate, dicylopentanyl (meth)acrylate, dicyclopentenyl (meth) acrylate, 4-tert-butyl cyclohexyl (meth)acrylate, (2-methyl-2-ethyl-1,3-dioxoran-4-yl)methyl (meth)acrylate, cyclic trimethylolpropaneformal (meth)acrylate, and 4-acriloylmorpholine.

Examples of the divalent (meth)acrylic monomer having a Tg, in a state of a cured product, of greater than 60° C.

include ethylene glycol di(meth)acrylate, triethylene glycol (meth)acrylate, glycerin di(meth)arylate, 1,6-hexanediol di(meth)acrylate, dimethylol-tricyclodecane di(meth)acrylate, 1,9-nonanediol di(meth)acrylate, dioxane glycol di(meth)acrylate, diethylene glycol di(meth)acrylate, dipropylene glycol di(meth)acrylate, ethoxylated hydrogenated bisphenol A di(meth)acrylate, 2-hydroxy-3-acryloyloxypropyl (meth)acrylate, and bis(2-methacryloyloxyethyl) N,N'-1,9-nonylene biscarbamate (diurethane di(meth)acrylate).

From the viewpoint of improving the smoothness of a surface of a cured product, while suppressing cracking of a material disposed around the cured product caused by rapid temperature increase, the curable composition preferably includes a monofunctional (meth)acrylic monomer and a difunctional (meth)arylic monomer, as a photopolymerizable component. The proportion of the compounds is not particularly limited, but a mass ratio of the monofuntcional (meth)acrylic monomer and the difunctional (meth)acrylic monomer (monofunctional (meth)acrylic monomer:difunctional (meth)acrylic monomer) is preferably within a range of from 1:0.1 to 1:2, more preferably from 1:0.2 to 1:1.5, further preferably from 1:0.3 to 1:0.8. In particular, in a case of using a monofunctional (meth)acrylic monomer having a Tg, in a state of a cured product, of greater than 60° and a difunctional (meth)acrylic monomer having a Tg, in a state of a cured product, of greater than 60°, as the monovalent (meth)acrylic monomer and the divalent (meth)acrylic monomer, the proportion of the compounds is preferably within the ranges as mentioned above.

The curable composition may include a photopolymerizable component other than a (meth)acrylic monomer, as necessary. Examples of the photopolymerizable component other than a (meth)acrylic monomer include styrene and a derivative thereof, and (meth)acrylonitrile.

When the curable composition includes a photopolymerizable component other than a (meth)acrylic monomer, the proportion of the (meth)acrylic monomer with respect to the total photopolymerizable component is preferably 80% by mass or more, more preferably 90% by mass or more, further preferably 95% by mass or more.

The content of the photopolymerizable component included in the curable composition is not particularly limited. From the viewpoint of improving the smoothness of a surface of a cured product, the content of the photopolymerizable component with respect to 100 parts by mass of the curable composition is preferably 18 parts by mass or more, more preferably 28 parts by mass or more, further preferably 38 parts by mass or more, yet further preferably 40 parts by mass or more, yet further preferably 50 parts by mass or more, particularly preferably 60 parts by mas or more.

When the curable composition includes an alcohol or an alcohol derivative, a thermoplastic component, or a (meth) acrylic monomer having a Tg, in a state of a cured product, of not greater than 60° C., the content of a photopolymerizable component (except for a (meth)acrylic monomer having a Tg, in a state of a cured product, of not greater than 60° C.) with respect to 100 parts by mass of the curable composition is preferably less than 97 parts by mass, more preferably less than 92 parts by mass, further preferably less than 90 parts by mass, yet further preferably less than 87 parts by mass, yet further preferably less than 80 parts by mass, particularly preferably less than 75 parts by mass, from the viewpoint of achieving a sufficient effect of stress relaxation of the component.

(Alcohol or Alcohol Derivative)

The alcohol or alcohol derivative that may be included in the curable composition is not particularly limited, and may be included alone or in combination of two or more kinds.

From the viewpoint of suppressing cracking of a material disposed around a cured product of the curable composition caused by rapid temperature increase, the alcohol or the alcohol derivative is preferably a polyol (alcohol having two or more hydroxy groups), a monoalcohol (alcohol having one hydroxy group) or derivatives thereof.

In the disclosure, the "alcohol derivative" refers to a compound having an alcohol structure in which a hydrogen atom of at least one hydroxy group is substituted by an organic group. The alcohol derivative may have an unsubstituted hydroxy group, or may not have an unsubstituted hydroxy group.

In the disclosure, the "polyol" includes a polyol not having an ether bond, a polyol having one ether bond and a polyol having two or more ether bonds (polyether polyol), and a derivative of the polyol may be referred to as a "polyol derivative".

In the disclosure, when a compound that corresponds to an alcohol or an alcohol derivative also corresponds to a photopolymerizable component (for example, an alcohol or an alcohol derivative having a (meth)acryloyl group), the compound is not regarded as an alcohol or an alcohol derivative.

Examples of the polyol not having an ether bond include glycerin, ethylene glycol, propylene glycol, butanediol, pentandiol, hexanediol, heptanediol, octanediol, nonanediol, and decanediol.

Examples of the polyol having one ether bond include diglycerin.

Example of the polyether polyol include polyalkylene glycol such as polyethylene glycol, polypropylene glycol; poly(oxyalkylene) glycerol triether, such as poly(oxypropylene) glycerol triether (triol-type polypropylene glycol); poly (oxyalkylene) monoalkyl ether, such as polyethylene glycol monomethyl ether, polyethylene glycol monobutyl ether, and polyethylene glycol monododecyl ether; and polytetramethylene glycol.

Examples of the monoalcohol include a monoalcohol of 6 to 20 carbon atoms, preferably a monoalcohol of 8 to 18 carbon atoms. More specifically, capryl alcohol, lauryl alcohol, myristyl alcohol, stearyl alcohol, oleyl alcohol and linoleic alcohol are preferred.

Examples of the alcohol derivative (polyol derivative or monoalcohol derivative) include a compound having a structure in which a hydrogen atom of at least one hydroxy group of an alcohol (a polyol or a monoalcohol, such as a polyether alcohol having 7 to 300 oxyalkylene structures) is substituted by a hydrocarbon group (in particular, an alkyl group of 1 to 15 carbon atoms); and a compound in which a hydrogen atom of at least one hydroxy group of an alcohol is condensed with a carboxylic acid, a phosphoric acid or the like, thereby forming a carboxylic acid ester, a phosphoric acid ester or the like.

The polyol derivative preferably has a structure in which a hydrogen atom of at least one hydroxy group, at a terminal of a polyol, is substituted by a hydrocarbon group, such as an alkyl group (in particular, an alkyl group of 1 to 15 carbon atoms). Examples of such a polyol derivative include a polyalkylene glycol alkyl ether, such as ethylene glycol dibutyl ether (dibutyl glycol), diethylene glycol monoethyl ether, diethylene glycol monobutyl ether, triethylene glycol monobutyl ether, tetraethylene glycol dimethyl ether, and polyethylene glycol alkyl ether; and a polyoxyalkylene alkyl ether.

Examples of the polyethylene glycol alkyl ether include polyethylene glycol monomethyl ether, polyethylene glycol dimethyl ether, polyethylene glycol monoethyl ether and polyethylene glycol diethyl ether.

The weight average molecular weight of the alcohol or the alcohol derivative may be from 100 to less than 20000, or from 200 to less than 10000. From the viewpoint of improving the smoothness of a surface of a cured product, the weight average molecular weight of the alcohol or the alcohol derivative is preferably 200 or more, more preferably 500 or more.

Sorbitan aliphatic acid esters, such as sorbitan oleate and sorbitan trioleate, are also preferred examples of the alcohol or the alcohol derivative.

The alcohol or the alcohol derivative is preferably a compound represented by the following Formula (3).

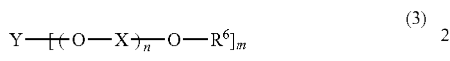

(3)

In Formula (3), $R^6$ represents a hydrogen atom or a hydrocarbon group of 1 to 20 carbon atoms that may have a substituent; X represents a divalent hydrocarbon group of 1 to 6 carbon atoms; Y represents a hydrocarbon group with a valency of m of 1 to 20 carbon atoms; n represents an integer of 0 to 300; m represents an integer of 1 to 8; when the number of X is two or more, the two or more of X may be the same as or different from each other; and when the number of $R^6$ is two or more, the two or more of $R^6$ may be the same as or different from each other.

The hydrocarbon group of 1 to 20 carbon atoms represented by $R^6$ may have a linear, branched or cyclic form, and may be unsaturated or saturated. Examples of the hydrocarbon group represented by $R^6$ include an alkyl group or an aryl group of 1 to 20 carbon atoms, preferably an alkyl group. The carbon number of the hydrocarbon group represented by $R^6$ is preferably from 1 to 12, more preferably from 1 to 8, further preferably from 1 to 4.

Examples of the substituent of the hydrocarbon group of 1 to 20 carbon atoms, represented by $R^6$, include an oxygen atom-containing group (such as an oxo group, an alkoxy group or a hydroxy group), a nitrogen atom-containing group (such as an amino group), a sulfur atom-containing group (such as a thiol group), a phosphorous atom-containing group (such as a phosphoric group) and a halogen atom.

The substituent of the hydrocarbon group of 1 to 20 carbon atoms, represented by $R^6$, is preferably a hydrogen atom, a methyl group or a (meth)acryloyl group, more preferably a hydrogen atom or a methyl group.

The divalent hydrocarbon group of 1 to 6 carbon atom, represented by X, may have a linear, branched or cyclic form, and may be unsaturated or saturated. The divalent hydrocarbon group represented by X is preferably an alkylene group of 1 to 6 carbon atoms, more preferably an ethylene group, a propylene group or a tetramethylene group.

The m-valent hydrocarbon group of 1 to 20 carbon atoms, represented by Y, may have a linear, branched or cyclic form, and may be unsaturated or saturated.

The integer represented by m is not particularly limited as long as it is from 1 to 8. The integer represented by m is preferably from 1 to 6, more preferably from 1 to 4, further preferably from 1 to 3.

When m is 3, Y is preferably a residual group obtained by eliminating all hydroxy groups from 1,2,3-propanetriol (glycerol). When m is 2, Y is preferably an alkylene group of 1 to 6 carbon atoms, more preferably an ethylene group, a propylene group or a tetramethylene group. When m is 1, Y is preferably a linear hydrocarbon group of 8 to 18 carbon atoms.

The integer represented by n is not particularly limited as long as it is from 0 to 300. The integer represented by n is preferably an integer of 0 to 200, more preferably 0 or an integer of 3 to 150, further preferably 0 or an integer of 5 to 100.

The weight average molecular weight (Mw) of the alcohol or the alcohol derivative is not particularly limited, and is preferably from 50 to less than 10000, more preferably from 150 to 9500, further preferably from 200 to 8000, yet further preferably from 400 to 4000. From the viewpoint of improving the smoothness of a surface of an article, the weight average molecular weight of the alcohol or the alcohol derivative is preferably as large as possible.

In the disclosure, the weight average molecular weight of the alcohol or the alcohol derivative is a value measured by gel permeation chromatography (GPC) using polystyrene as a standard.

The amount of the alcohol or the alcohol derivative included in the curable composition is not particularly limited. From the viewpoint of achieving a sufficient effect of stress relaxation, the content of the alcohol or the alcohol derivative with respect to 100 parts by mass of the curable composition is preferably 5 parts by mass or more, more preferably 9 parts by mass or more, further preferably 14 parts by mass or more. From the viewpoint of improving the smoothness of a surface of a cured product, the content of the alcohol or the alcohol derivative with respect to 100 parts by mass of the curable composition is preferably less than 60 parts by mass, more preferably less than 40 parts by mass, further preferably less than 30 parts by mass.

(Thermoplastic Component)

The thermoplastic component included in the curable composition is not particularly limited, and may be included alone or in combination of two or more kinds.

In the disclosure, the thermoplastic component refers to a substance having a property of softening upon heating.

From the viewpoint of achieving a sufficient effect of relaxing a stress generated due to volume expansion of a cured product of the curable composition, the thermoplastic component preferably has a softening point within a range of from 70° C. to 130° C., more preferably from 80° C. to 120° C., further preferably from 85° C. to 110° C.

The softening point of the disclosure is measured by a ring-and-ball method according to JIS K 2207:2006. The measurement device may be ASP-MG, Meitec Corporation, for example.

Examples of the thermoplastic component include thermoplastic resins. From the viewpoint of thermal stability, the thermoplastic component is preferably a hydrocarbon polymer (a polymer consisting only of carbon atoms and hydrogen atoms), more preferably a hydrocarbon polymer having a cyclic hydrocarbon group (preferably in a side chain). The cyclic hydrocarbon group may be unsaturated or saturated, preferably saturated.

Specific examples of the hydrocarbon polymer include a xylene resin, an alicyclic hydrocarbon resin such as a petroleum resin and a hydrogenated product thereof, a terpene resin and a hydrogenated product thereof, and a polyisopropyl toluene and a hydrogenated product thereof.

The weight average molecular weight (Mw) of the thermoplastic component is not particularly limited, but is preferably from 200 to less than 10000, more preferably from 300 to 9000, further preferably from 400 to 8000.

The weight average molecular weight (Mw) of the thermoplastic component is measured by gel permeation chromatography (GPC) with polystyrene as a standard.

The content of the thermoplastic component included in the curable composition is not particularly limited. From the viewpoint of achieving a sufficient effect of relaxing a stress generated due to volume expansion of a cured product, the content of the thermoplastic component with respect to 100 parts by mass is preferably 9 parts by mass or more, more preferably 19 parts by mass or more, further preferably 24 parts by mass or more. From the viewpoint of improving the smoothness of a surface of a cured product, the content of the thermoplastic component with respect to 100 parts by mass is preferably less than 70 parts by mass, more preferably less than 50 parts by mass, further preferably less than 40 parts by mass.

(Photopolymerization Initiator)

The photopolymerization initiator included in the curable composition is not particularly limited, and may be included alone or in combination of two or more kinds.

Examples of the photopolymerization initiator include an alkylphenone compound, an acylphosphine oxide compound, a titanocene compound, an oxime ester compound, a benzoin compound, an acetophenone compound, a benzophenone compound, a thioxanthone compound, an α-acyloxime ester compound, a phenyl glyoxylate compound, a benzil compound, an azo compound, a diphenyl sulfide compound, an iron-phthalocyanine compound, a benxoin ether compound, and an anthraquinone compound.

From the viewpoint of reactivity, the photopolymerization initiator preferably includes at least one selected from the group consisting of an alkylphenone compound and an acylphosphine oxide compound. In particular, from the viewpoint of improving the accuracy of an article, an acylphosphine oxide compound is preferred, and diphenyl (2,4,6-trimethylbenzoyl)phosphine oxide is more preferred.

The content of the photopolymerization initiator included in the curable composition is preferably from 0.1 parts by to 20 parts by mass, more preferably from 0.5 parts by mass to 10 parts by mass, further preferably from 1 part by mass to 5 parts by mass, with respect to 100 parts by mass of the photopolymerizable component.

The curable composition preferably has an excellent durability against rapid temperature increase (i.e., ability to relax a stress generated due to volume expansion). Specifically, the curable composition preferably forms a cured product that does not cause breaking or cracking of the plaster (a cristobalite investment, CRISTOBALITE FF-Ex, Kuraray Noritake Dental Inc.) in the heating test as described in the Example.

(Other Components)

The curable composition may include a component other than a photopolymerizable component, an alcohol or an alcohol derivative, a thermoplastic component, and a photopolymerization initiator. For example, the curable composition may include a filler, a modifier, a stabilizer, an antioxidant, a solvent and the like.

(Usage of the Curable Composition)

As mentioned above, the curable composition is suitably used as a material for evaporative pattern casting, in which a cured product of the curable composition is used as an evaporative pattern.

The shape of the cured product obtained from the curable composition is not particularly limited. From the viewpoint of using the cured product as an evaporative pattern for evaporative pattern casting, the cured product preferably has a three-dimensional shape.

The method of obtaining a cured product having a three-dimensional shape from the curable composition may be stereolithography, for example.

Specifically, a cured product may be obtained by repeating a process of exposing the curable composition, which is in the form of a layer, with ultraviolet light in a patterned manner to form a cured product layer in the exposed region. The device for performing a process of stereolithography is not particularly limited, and may be performed with a 3D printer or the like.

The cured product obtained from the curable composition is less susceptible to cracking of a material disposed around the same, even under a rapid temperature increase. Therefore, the cured product is particularly suitably used for producing a three-dimensional article formed of a fragile material, such as plaster. It is possible to use the three-dimensional article as a mold to produce a product having a shape corresponding to the concave portion of the three-dimensional article, which is used as an evaporative pattern to be eliminated. Specifically, the three-dimensional article is suitably used as a mold to produce an artificial tooth, a medical appliance used in the mouth, a jaw model, and the like.

<Evaporative Pattern>

The evaporative pattern according to the disclosure is a cured product of the curable composition, as described above.

The method for obtaining a cured product of the curable composition is not particularly limited, and may be selected depending on the type of the components included in the curable composition. It is possible to produce an evaporative pattern having a three-dimensional shape by stereolithography, as described above.

<Method of Producing Three-Dimensional Article>

The method for producing a three-dimensional article according to the disclosure includes a process of disposing a material for the three-dimensional article around a cured product, which is obtained from the curable composition as described above; and a process of eliminating the cured product by heating.

According to the method, it is possible to suppress cracking of the three-dimensional article during the production process. Therefore, the method is suitable for the production of a three-dimensional article using a fragile material, such as plaster. In addition, since cracking of the material is suppressed even when the temperature is rapidly increased in the process of eliminating the cured product, the method has excellent production efficiency.

The material for the three-dimensional article used in the method is not particularly limited, and examples thereof include an inorganic material such as plaster, clay, kaolin and metal, an organic material such as resin, or a combination of these materials.

The environment in which the cured product is heated is not particularly limited, as long as the cured product can be eliminated. For example, the heating may be performed in the atmospheric air or in an inert atmosphere such as nitrogen or argon.

The temperature for heating the cured product is not particularly limited, as long as the cured product can be eliminated. For example, the maximum temperature for the heating may be selected from 650° C. to 2000° C., depending on the type of the material such as plaster.

The rate of increasing the temperature for heating the cured product may be constant or may be changed. For example, the rate of increasing the temperature (maximum rate) may be within a range of from 30° C./min to 50° C./min, preferably 40° C./min or less.

The usage of the three-dimensional article produced by the method is not particularly limited. For example, the three-dimensional article may be used as a mold for producing a product having a shape corresponding to the concave portion, which is formed by eliminating the evaporative pattern, of the three-dimensional article. Specifically, the three-dimensional article may be used as a mold to produce an artificial tooth, a medical appliance used in the mouth, a jaw model, and the like.

EXAMPLES

In the following, the invention is explained more specifically based on the Examples. However, the invention is not limited to these Examples.

<Preparation of the Curable Composition>

Curable compositions were prepared by using the materials indicated in Tables 1 to 6. Details of the materials are described below.

The numerical value at the right-side column of the component refers to the amount (parts by mass) of the component with respect to 100 parts by mass of the total amount of the thermoplastic component, the alcohol or the alcohol derivative and the photopolymerizable component.

The "Mw" refers to the weight average molecular weight of the compound, and "AEw" refers to the (meth)acryloyl equivalent amount.

The content of the (meth)acryloyl group indicated in Tables 1 to 6 is a value of the content of (meth)acryloyl group (mol/g) multiplied by 1000.

The minimum value of the storage elastic modulus indicated in Tables 1 to 6 refers to the minimum value of the storage elastic modulus within a range of from 25° C. to 300° C.

Photopolymerizable component 1: Isobornyl Acrylate (IBXA, Kyoeisha Chemical Co., Ltd.)

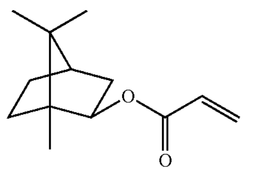

Photopolymerizable component 2: Isobornyl Methacrylate (MX, Kyoeisha Chemical Co., Ltd.)

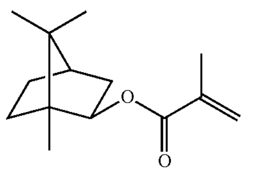 [SMILES: C=C(C)C(=O)OC1CC2CCC1(C)C2(C)C]

Photopolymerizable component 3: 4-Acryloylmorpholine (ACMO, Fujifilm Wako Pure Chemical Corporation)

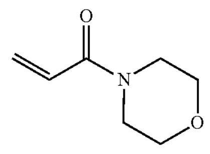

Photopolymerizable component 4: dicyclopentanyl acrylate (FA-513AS, Hitachi Chemical Corporation)

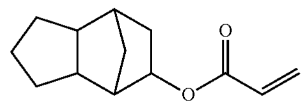

Photopolymerizable component 5: dicyclopentanylmethyl acrylate (SR789, Sartomer)

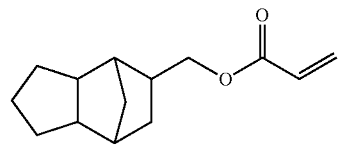 [SMILES: C=CC(=O)OCC1CC2CC1C1CCCC21]

Photopolymerizable component 6: 4-tert-butylcyclohexyl acrylate (tBCH, Sartomer)

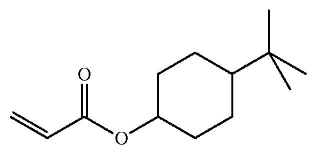

Photopolymerizable component 7: lauryl acrylate (LA, Kyoeisha Chemical Co., Ltd., Tg: −3° C.)

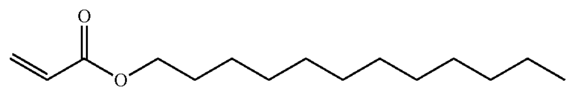 [SMILES: C=CC(=O)OCCCCCCCCCCCC]

Photopolymerizable component 8: 4-hydroxybutyl acrylate (4HBA, Osaka Organic Chemical Industry Ltd., Tg: −40° C.)

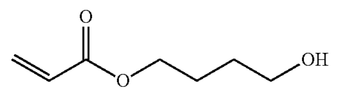

Photopolymerizable component 9: phenoxyethylene glycol acrylate (PO-A, Shin-Nakamura Chemical Co., Ltd.)

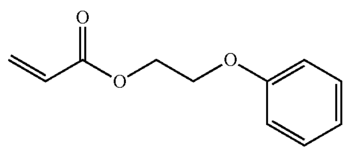

Photopolymerizable component 10: 2-dodecyl-1-hexadecanyl acrylate (DHD-A, Kyoeisha Chemical Co., Ltd., Tg: −23° C.)

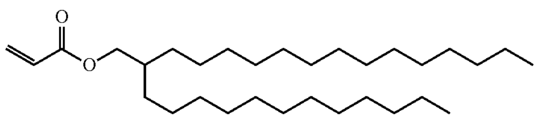 [SMILES: C=CC(=O)OCC(CCCCCCCCCCCC)CCCCCCCCCCCCCC]

Photopolymerizable component 11: 2-hydroxyethyl acrylate, (HOA (N), Kyoeisha Chemical Co., Ltd., Tg: −15° C.)

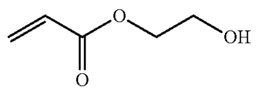

Photopolymerizable component 12: 2-acryloyloxyethyl succinate (HOA-MS (N), Kyoeisha Chemical Co., Ltd., Tg: −40° C.)

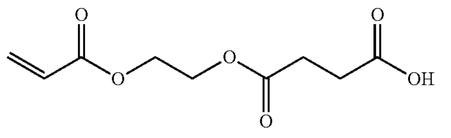

Photopolymerizable component 13: 2-[[(butylamino)carbonyl]oxy]ethyl acrylate (BAA, Sigma-Aldrich, Tg: −20° C.)

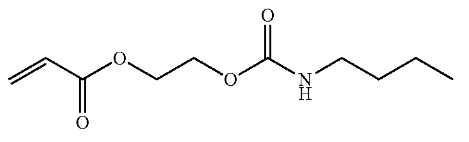

Photopolymerizable component 14: 2-(2-ethoxyethoxy) ethyl acrylate (EEEA, Tokyo Chemical Industry Co., Ltd.)

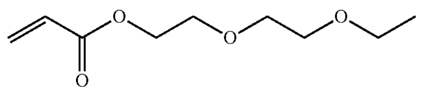

Photopolymerizable component 15: tetrahydrofurfuryl methacylate (THF (1000), Kyoeisha Chemical Co., Ltd., Tg: 60° C.)

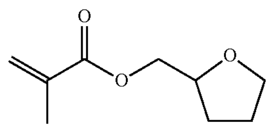

Photopolymerizable component 16: dimethylol-tricyclodecane diacrylate (DCPA, Kyoeisha Chemical Co., Ltd.)

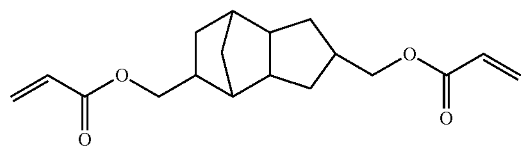 [SMILES: C=CC(=O)OCC1CC2C3CC(COC(=O)C=C)C(C3)C2C1]

Photopolymerizable component 17: dimethylol-tricyclodecane dimethacrylate (DCP, Shin-Nakamura Chemical Co., Ltd.)

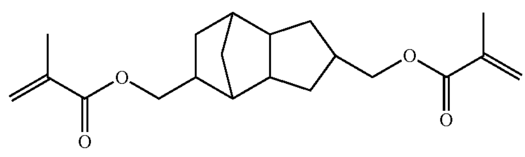 [SMILES: C=C(C)C(=O)OCC1CC2C3CC(COC(=O)C(=C)C)C(C3)C2C1]

Photopolymerizable component 18: 1,6-hexanediol dimethacrylate (1,6 HX, Kyoeisha Chemical Co., Ltd.)

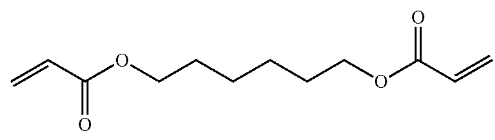 [SMILES: C=CC(=O)OCCCCCCOC(=O)C=C]

Photopolymerizable component 19: 1,9-nonanediol dimethacrylate (A-NOD-N, Shin-Nakamura Chemical Co., Ltd.)

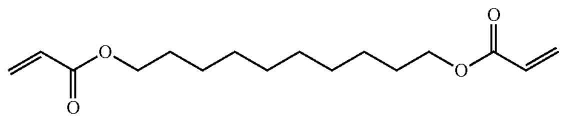 [SMILES: C=CC(=O)OCCCCCCCCCCOC(=O)C=C]

Photopolymerizable component 20: ethylene glycol dimethacrylate (EG, Kyoeisha Chemical Co., Ltd.)

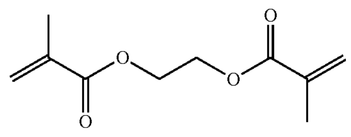

Photopolymerizable component 21: triethylene glycol dimethacrylate (3EG, Kyoeisha Chemical Co., Ltd.)

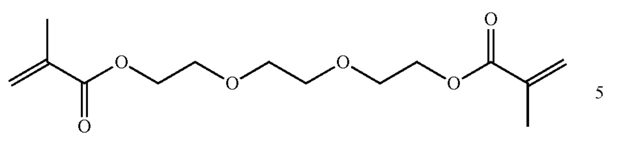

Photopolymerizable component 22: ethoxylated bisphenol A dimethacrylate (EO=2.6 mol) (BP2EM, Kyoeisha Chemical Co., Ltd.)

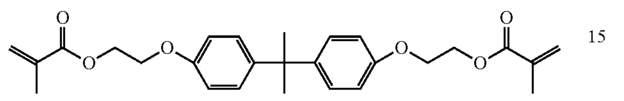

Photopolymerizable component 23: glycerin dimethacrylate (G101P, Kyoeisha Chemical Co., Ltd.)

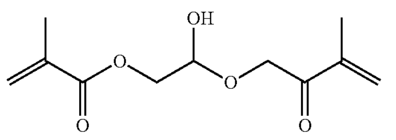 [SMILES: C=C(C)C(=O)COC(O)COC(=O)C(=C)C]

Photopolymerizable component 24: dioxane glycol diacrylate (A-DOG, Shin-Nakamura Chemical Co., Ltd.)

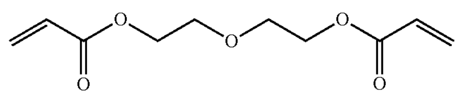

Photopolymerizable component 26: dipropylene glycol diacrylate (APG-100, Shin-Nakamura Chemical Co., Ltd.)

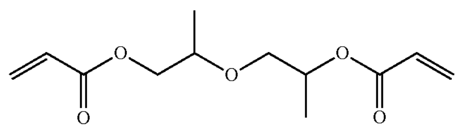 [SMILES: C=CC(=O)OCC(C)OCC(C)OC(=O)C=C]

Photopolymerizable component 27: triethylene glycol dimethacrylate (3EG-A, Kyoeisha Chemical Co., Ltd.)

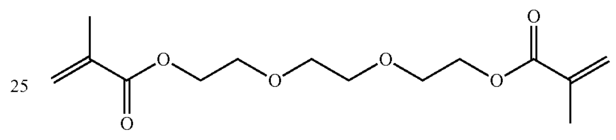

Photopolymerizable component 28: ethoxylated hydrogenated bisphenol A diacrylate (HBPE-4, EO=4 mol, DKS Co., Ltd)

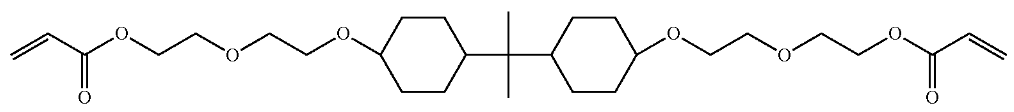 [SMILES: C=CC(=O)OCCOCCOC1CCC(C(C)(C)C2CCC(OCCOCCOC(=O)C=C)CC2)CC1]

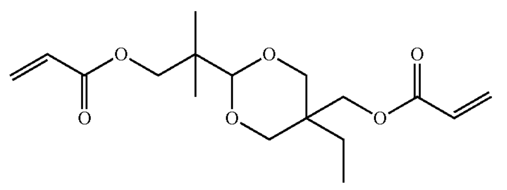

Photopolymerizable component 25: diethyelene glycol diacrylate (FA-222, Hitachi Chemical Corporation)

Photopolymerizable component 29: 2-hydroxy-3-acryloyloxypropyl methacrylate (G201P, Kyoeisha Chemical Co., Ltd.)

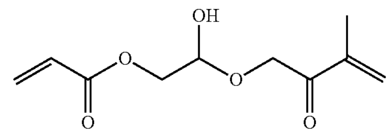

Photopolymerizable component 30: urethane mechacrylate (UDMA, Fujifilm Wako Pure Chemical Corporation)

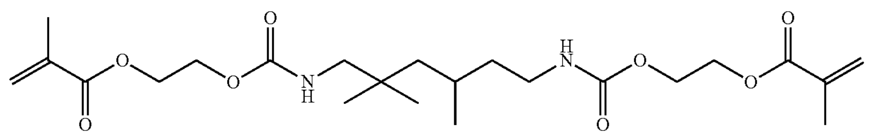 [SMILES: C=C(C)C(=O)OCCOC(=O)NCCC(C)CC(C)(C)CNC(=O)OCCOC(=O)C(=C)C]

Photopolymerizable component 31: polyethylene glycol (400) diacrylate (FA-240A, Hitachi Chemical Corporation, Tg: −25° C.)

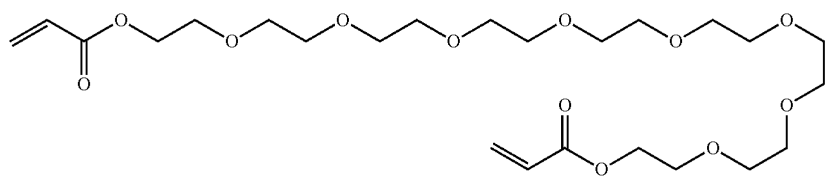 [SMILES: C=CC(=O)OCCOCCOCCOCCOCCOCCOCCOCCOCCOC(=O)C=C]

Photopolymerizable component 32: polypropylene glycol (400) diacrylate (FA-P240A, Hitachi Chemical Corporation, Tg: −8° C.)

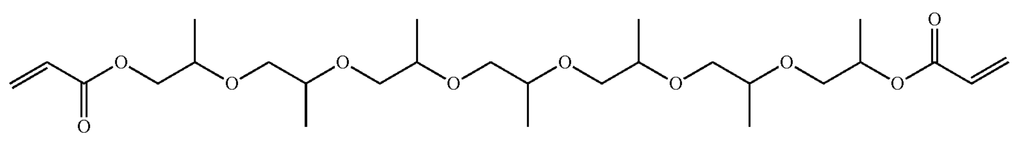 [SMILES: C=CC(=O)OCC(C)OCC(C)OCC(C)OCC(C)OCC(C)OCC(C)OCC(C)OC(=O)C=C]

Photopolymerizable component 33: polypropylene glycol (700) diacrylate (APG-700, Shin-Nakamura Chemical Co., Ltd., Tg: −32° C.)

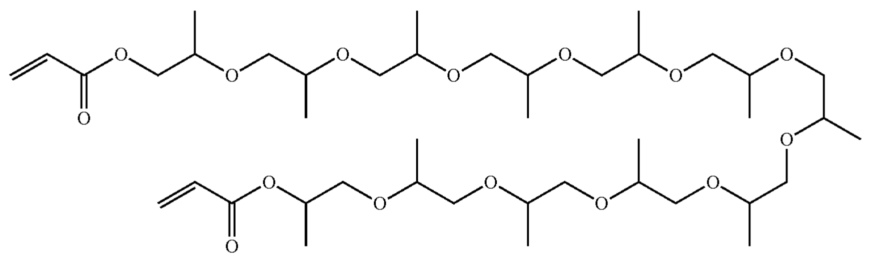 [SMILES: C=CC(=O)OCC(C)OCC(C)OCC(C)OCC(C)OCC(C)OCC(C)OCC(C)OCC(C)OCC(C)OCC(C)OCC(C)OCC(C)OC(=O)C=C]

Photopolymerizable component 34: ethoxylated bisphenol A diacrylate (EO=10 mol) (ABPE10, Shin-Nakamura Chemical Co., Ltd., Tg: −12° C.)

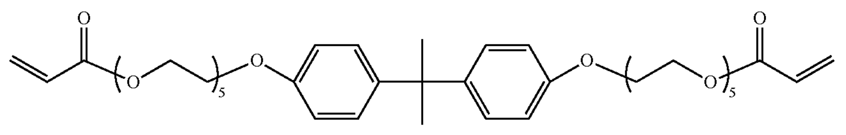

Thermoplastic component 1: hydrocarbon polymer having a structural unit represented by the following formula (non-polarized, softening point: 90° C., P90, Arakawa Chemical Industries, Ltd.)

Thermoplastic component 2: hydrocarbon polymer having a structural unit represented by the following formula (non-polarized, softening point: 140° C., P140, Arakawa Chemical Industries, Ltd.)

Thermoplastic component 3: hydrocarbon polymer having a structural unit represented by the following formula (aromatic group-polarized, softening point: 90° C., M90, Arakawa Chemical Industries, Ltd.)

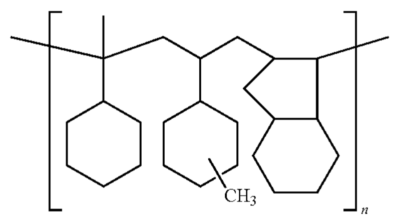

Thermoplastic component 4: hydrocarbon polymer having a structural unit represented by the following formula (softening point: 100° C., k100, Yasuhara Chemical Co., Ltd.)

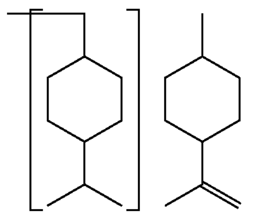

Alcohol or alcohol derivative 1: polyethylene glycol (PEG1000, weight average molecular weight: 1000, Fujifilm Wako Pure Chemical Corporation)

Alcohol or alcohol derivative 2: polyethylene glycol (PEG200, weight average molecular weight: 200, Fujifilm Wako Pure Chemical Corporation)

Alcohol or alcohol derivative 3: polyethylene glycol (PEG6000, weight average molecular weight: 6000, Fujifilm Wako Pure Chemical Corporation)

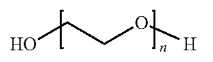

Alcohol or alcohol derivative 4: polypropylene glycol (PPG D1000, weight average molecular weight: 1000, Fujifilm Wako Pure Chemical Corporation)

Alcohol or alcohol derivative 5: polypropylene glycol (PPG T700, weight average molecular weight: 700, Fujifilm Wako Pure Chemical Corporation)

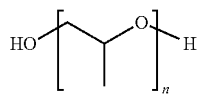

Alcohol or alcohol derivative 6: polytetramethyelne glycol (PTMG 650, weight average molecular weight: 650, Fujifilm Wako Pure Chemical Corporation)

Alcohol or alcohol derivative 7: polytetramethyelne glycol (PTMG 1000, weight average molecular weight: 1000, Fujifilm Wako Pure Chemical Corporation)

Alcohol or alcohol derivative 8: polytetramethyelne glycol (PTMG 2000, weight average molecular weight: 2000, Fujifilm Wako Pure Chemical Corporation)

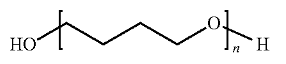

Alcohol or alcohol derivative 9: polyethylene glycol dimethyl ether (PEGDM 250, weight average molecular weight: 250, Fujifilm Wako Pure Chemical Corporation)

Alcohol or alcohol derivative 10: polyethylene glycol dimethyl ether (PEGDM 1000, weight average molecular weight: 1000, Fujifilm Wako Pure Chemical Corporation)

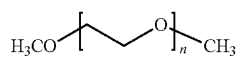

Alcohol or alcohol derivative 11: glycerin (Fujifilm Wako Pure Chemical Corporation)

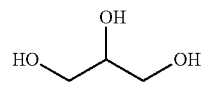

Alcohol or alcohol derivative 12: diglycerin (Fujifilm Wako Pure Chemical Corporation)

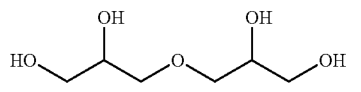

Alcohol or alcohol derivative 13: dibutyl diglycol (DBDG, Nippon Nyukazai Co., Ltd.)

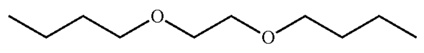

Alcohol or alcohol derivative 14: lauryl alcohol (Fujifilm Wako Pure Chemical Corporation)

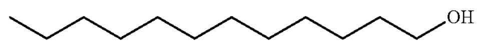

Alcohol or alcohol derivative 15: sorbitan trioleate (NEWCOL 3-80, Nippon Nyukazai Co., Ltd.)

Alcohol or alcohol derivative 16: sorbitan oleate (NEWCOL 80, Nippon Nyukazai Co., Ltd.)

Alcohol or alcohol derivative 17: polyoxyalkylene alkyl ether (NEWCOL 2300-FE, Nippon Nyukazai Co., Ltd.)

Alcohol or alcohol derivative 18: polyoxyalkylene alkyl ether (NEWCOL 2309-FZ, Nippon Nyukazai Co., Ltd.)

Photopolymerization initiator 1: acylphosphine oxide compound (IRGACURE TPO, BASF SE, indicated as TPO in Tables 1 to 6)

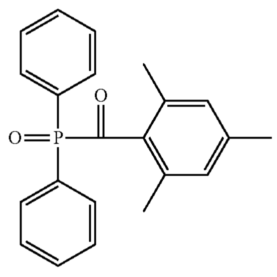 [SMILES: Cc1cc(C)c(C(=O)P(=O)(c2ccccc2)c2ccccc2)c(C)c1]

Photopolymerization initiator 2: amino alkyklphenone compound (IRGACURE 379, BASF SE, indicated as 379 in Tables 1 to 6)

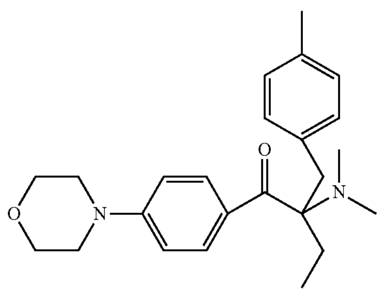 [SMILES: CCC(Cc1ccc(C)cc1)(C(=O)c1ccc(N2CCOCC2)cc1)N(C)C]

Photopolymerization initiator 3: acylphosphine oxide compound (IRGACURE 819, BASF SE, indicated as 819 in Tables 1 to 6)

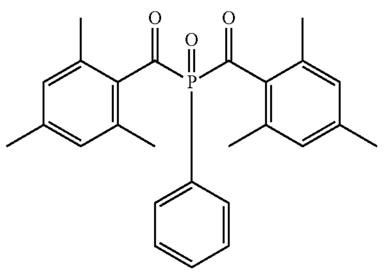

<Evaluation of Surface of Article and Accuracy of Article>

The curable composition was subjected to the following evaluation test.

A sheet-like product having a size of 20 mm (width), 40 mm (height) and 1 mm (thickness) was obtained by irradiating with visible light (wavelength: 405 nm) at a layering width of 50 μm and at an irradiance of 11 mJ/cm$^2$ per layer, using a 3D printer (CARA PRINT 4.0, Kulzer GmbH).

The product was further cured by irradiating the same with ultraviolet light (wavelength: 365 nm) at an irradiance of 3 J/cm$^2$, thereby obtaining a test piece.

The surface of the test piece was evaluated according to the following criteria. The results are shown in Table 1 to 6.

○: the surface of the test piece is smooth

Δ: the surface of the test piece is not smooth but not tacky x: the surface of the test piece is tacky The accuracy of the product was evaluated according to the following criteria. The results are shown in Table 1 to 6.

○: the product has a width of 20±0.2 mm, a height of 40±0.2 mm, and a thickness of 1±0.05 mm Δ: the product has at least one of the width, height or thickness that is not within the above ranges x: the product has at least two of the width, height or thickness that are not within the above ranges <Heating Test>

The curable composition was subjected to the following heating test.

A product having a shape as shown in Table 1 (diameter of spherical portion: 10 mm, total height: 48 mm, diameter of neck portion (i.e., stick-like portion with a minimum diameter at the lower part of the shape): 3 mm) was obtained using a 3D printer (CARA PRINT 4.0, Kulzer GmbH) by irradiating with visible light (wavelength: 405 nm) at a layering width of 50 μm and at an irradiance of 11 mJ/cm$^2$ per layer.

The product was further cured by irradiating the same with ultraviolet light (wavelength: 365 nm) at an irradiance of 3 J/cm$^2$, thereby obtaining an evaporative pattern.

Subsequently, the evaporative pattern was buried in a mixture, prepared by mixing plaster (a cristobalite investment, CRISTOBALITE FF-Ex, Kuraray Noritake Dental Inc.) with water at weight ratio (plaster:water) of 100:35, and left to stand for 30 minutes. The minimum thickness of the plaster was 1 mm at the neck portion of the evaporative pattern, and the maximum thickness of the plaster was 1 cm at the spherical portion of the evaporative pattern.

The evaporative pattern around which the plaster was disposed was heated in an electric furnace (FO100, Yamato Scientific Co., Ltd.) at 700° C. for 60 minutes.

After the heating, the state of the plaster was visually observed. When breaking or cracking was not observed in the plaster, the curable composition is regarded as having durability with respect to rapid temperature increase. The "breaking" refers to a state in which the plaster separates into multiple pieces after the heating, including a state in which the total or a part of the plaster is crushed into small fragments. The durability was evaluated according to the following criteria.

OK: breaking or cracking was not observed in the plaster

NG: breaking or cracking was observed in the plaster

<Evaluation of Cast (1)>

A cast was obtained with a gold-silver-palladium alloy (CASTWELL M.C., GC Corporation) using the plaster obtained by the heating test and a casting machine (HERACAST IQ, Kulzer GmbH). The surface of the cast was visually observed, and evaluated according to the following criteria. The results are shown in Table 1 to 6.

○: the cast does not have a burr on the surface

Δ: the cast has a burr with a size of not greater than 0.5 mm from the surface x: the cast has a burr with a size of greater than 0.5 mm from the surface <Measurement of Storage Elastic Modulus>

The minimum value of the storage elastic modulus, in a range of from 25° C. to 300° C., and the storage elastic modulus at 25° C. of the cured products obtained from the curable compositions prepared in the Comparative Examples and the Examples were measured by the following method. The results are shown in Tables 1 to 6.

A test piece having a size of 30 mm×1.5 mm×1 mm is obtained from the curable composition, using a 3D printer (CARA PRINT 4.0, Kulzer GmbH) by irradiating with visible light (wavelength: 405 nm) at a layering width of 50 μm and at an irradiance of 11 mJ/cm$^2$ per layer; and further irradiating with ultraviolet light (wavelength: 365 nm) at an irradiance of 3 J/cm$^2$. The test piece is set in a dynamic viscoelastic analyzer (DVA-225, IT Keisoku Seigyo K.K.) and the storage elastic modulus is measured by increasing the temperature from 25° C. to 300° C. at a rate of 3° C./min at a measurement frequency of 1 Hz. The change in the storage elastic modulus is observed, and the lowest value is determined as the minimum value of the storage elastic modulus.

TABLE 1

| | | Mw | AEw | Comparative Example 1 | Example 1 | Example 2 | Example 3 | Example 4 | Example 5 | Example 6 | Example 7 |
|---|---|---|---|---|---|---|---|---|---|---|---|
| Thermoplastic component | P90 | — | — | | 40 | 40 | 40 | 40 | 30 | 20 | 20 |
| | P140 | — | — | | | | | | | | |
| | M90 | — | — | | | | | | | | |
| | k100 | — | — | | | | | | | | |
| Monofunctional monomer | IBXA | 208.3 | 208.3 | 70 | 60 | 30 | 42 | 54 | 35 | 56 | 72 |
| | IBX | 332.4 | 166.2 | | | | | | | | |
| | ACMO | 141.2 | 141.2 | | | | | | | | |
| | FA-513AS | 206.3 | 206.3 | | | | | | | | |
| | SR789 | 220.3 | 220.3 | | | | | | | | |
| | tBCH | 210.3 | 210.3 | | | | | | | | |
| | LA | 240.4 | 240.4 | | | | | | | | |
| | 4HBA | 144.2 | 144.2 | | | | | | | | |
| | PO-A | 192.2 | 192.2 | | | | | | | | |
| | DHD-A | 464.8 | 464.8 | | | | | | | | |
| | HOA(N) | 116.1 | 116.1 | | | | | | | | |
| | HOA-MS(N) | 216.2 | 216.2 | | | | | | | | |
| | BAA | 215.3 | 215.3 | | | | | | | | |
| | EEEA | 188.2 | 188.2 | | | | | | | | |
| | THF(1000) | 170.2 | 170.2 | | | | | | | | |
| Difunctional monomer | DCPA | 304.4 | 152.2 | 30 | | 30 | 18 | 6 | 35 | 24 | 8 |
| | DCP | 332.4 | 166.2 | | | | | | | | |
| | 1.6HX | 254.3 | 127.2 | | | | | | | | |
| | A-NOD-N | 282.4 | 141.2 | | | | | | | | |
| | EG | 198.2 | 99.1 | | | | | | | | |
| | 3EG | 286.3 | 143.2 | | | | | | | | |
| | BP2EM | 479.0 | 239.5 | | | | | | | | |
| | G101P | 228.2 | 114.1 | | | | | | | | |
| | A-DOG | 326.4 | 163.2 | | | | | | | | |
| | FA-222 | 214.2 | 107.1 | | | | | | | | |
| | APG-100 | 242.3 | 121.1 | | | | | | | | |
| | 3EG-A | 258.3 | 129.1 | | | | | | | | |
| | HBPE-4 | 524.7 | 262.3 | | | | | | | | |
| | G201P | 214.2 | 107.1 | | | | | | | | |
| | UDMA | 470.6 | 235.3 | | | | | | | | |
| | FA240A | 522.6 | 261.3 | | | | | | | | |
| | FAP240A | 532.7 | 266.3 | | | | | | | | |
| | APG700 | 823.1 | 411.5 | | | | | | | | |
| | ABPE10 | 776.9 | 388.4 | | | | | | | | |
| Photopolymerization initiator | TPO | — | — | 2 | 2 | 2 | 2 | 2 | 2 | 2 | 2 |
| | 379 | — | — | | | | | | | | |
| | 819 | — | — | | | | | | | | |
| Total | | | | 102 | 102 | 102 | 102 | 102 | 102 | 102 | 102 |
| Content of (meth)acryloyl group (mol/g) × 1000 | | | | 5.23 | 2.82 | 3.34 | 3.14 | 2.93 | 3.90 | 4.18 | 3.90 |
| Minimum value of storage elastic modulus [$\times 10^7$ Pa] | | | | 1.29 | 0.0066 | 0.33 | 0.13 | 0.30 | 0.46 | 0.54 | 0.48 |
| Storage elastic modulus at 25° C. [$\times 10^9$ Pa] | | | | 1.73 | 1.73 | 1.73 | 1.75 | 1.70 | 1.72 | 1.86 | 1.35 |
| Heating test | | | | NG | OK | OK | OK | OK | OK | OK | OK |
| Surface of article | | | | ○ | x | Δ | Δ | Δ | Δ | ○ | Δ |
| Accuracy of article | | | | ○ | x | ○ | ○ | ○ | ○ | ○ | Δ |
| Evaluation of cast | | | | — | ○ | ○ | ○ | ○ | ○ | ○ | ○ |

| | | Mw | AEw | Example 8 | Example 9 | Example 10 | Example 11 | Example 12 | Example 13 | Example 14 |
|---|---|---|---|---|---|---|---|---|---|---|
| Thermoplastic component | P90 | — | — | 20 | | | 25 | 20 | 20 | 20 |
| | P140 | — | — | | | 20 | | | | |
| | M90 | — | — | | 20 | | | | | |
| | k100 | — | — | | | | | | | |
| Monofunctional monomer | IBXA | 208.3 | 208.3 | 56 | 56 | 56 | 52.5 | 56 | 56 | 56 |
| | IBX | 332.4 | 166.2 | | | | | | | |
| | ACMO | 141.2 | 141.2 | | | | | | | |
| | FA-513AS | 206.3 | 206.3 | | | | | | | |
| | SR789 | 220.3 | 220.3 | | | | | | | |
| | tBCH | 210.3 | 210.3 | | | | | | | |
| | LA | 240.4 | 240.4 | | | | | | | |
| | 4HBA | 144.2 | 144.2 | | | | | | | |
| | PO-A | 192.2 | 192.2 | | | | | | | |
| | DHD-A | 464.8 | 464.8 | | | | | | | |
| | HOA(N) | 116.1 | 116.1 | | | | | | | |
| | HOA-MS(N) | 216.2 | 216.2 | | | | | | | |
| | BAA | 215.3 | 215.3 | | | | | | | |
| | EEEA | 188.2 | 188.2 | | | | | | | |
| | THF(1000) | 170.2 | 170.2 | | | | | | | |

TABLE 1-continued

| | | | | | | | | | | |
|---|---|---|---|---|---|---|---|---|---|---|
| Difunctional monomer | DCPA | 304.4 | 152.2 | 24 | 24 | 24 | | | | |
| | DCP | 332.4 | 166.2 | | | | | 24 | | |
| | 1.6HX | 254.3 | 127.2 | | | | | | 24 | |
| | A-NOD-N | 282.4 | 141.2 | | | | 22.5 | | | |
| | EG | 198.2 | 99.1 | | | | | | | 24 |
| | 3EG | 286.3 | 143.2 | | | | | | | |
| | BP2EM | 479.0 | 239.5 | | | | | | | |
| | G101P | 228.2 | 114.1 | | | | | | | |
| | A-DOG | 326.4 | 163.2 | | | | | | | |
| | FA-222 | 214.2 | 107.1 | | | | | | | |
| | APG-100 | 242.3 | 121.1 | | | | | | | |
| | 3EG-A | 258.3 | 129.1 | | | | | | | |
| | HBPE-4 | 524.7 | 262.3 | | | | | | | |
| | G201P | 214.2 | 107.1 | | | | | | | |
| | UDMA | 470.6 | 235.3 | | | | | | | |
| | FA240A | 522.6 | 261.3 | | | | | | | |
| | FAP240A | 532.7 | 266.3 | | | | | | | |
| | APG700 | 823.1 | 411.5 | | | | | | | |
| | ABPE10 | 776.9 | 388.4 | | | | | | | |
| Photopolymerization initiator | TPO | — | — | | 2 | 2 | 2 | 2 | 2 | 2 |
| | 379 | — | — | 2 | | | | | | |
| | 819 | — | — | | | | | | | |
| Total | | | | 102 | 102 | 102 | 102 | 102 | 102 | 102 |
| Content of (meth)acryloyl group (mol/g) × 1000 | | | | 4.18 | 4.18 | 4.18 | 4.03 | 4.05 | 4.49 | 5.01 |
| Minimum value of storage elastic modulus [$\times 10^7$ Pa] | | | | 0.55 | 0.71 | 0.53 | 0.51 | 0.77 | 0.52 | 0.75 |
| Storage elastic modulus at 25° C. [$\times 10^9$ Pa] | | | | 1.88 | 2.99 | 1.83 | 1.84 | 1.93 | 1.47 | 1.47 |
| Heating test | | | | OK | OK | OK | OK | OK | OK | OK |
| Surface of article | | | | ○ | ○ | ○ | ○ | ○ | ○ | ○ |
| Accuracy of article | | | | Δ | ○ | ○ | ○ | ○ | ○ | ○ |
| Evaluation of cast | | | | Δ | Δ | ○ | ○ | Δ | ○ | Δ |

TABLE 2

| | | | | Example | | | | | | |
|---|---|---|---|---|---|---|---|---|---|---|
| | | Mw | AEw | 15 | 16 | 17 | 18 | 19 | 20 | 21 |
| Thermoplastic component | P90 | — | — | 20 | 20 | 20 | 20 | 20 | 20 | 20 |
| | P140 | — | — | | | | | | | |
| | M90 | — | — | | | | | | | |
| | k100 | — | — | | | | | | | |
| Monofunctional monomer | IBXA | 208.3 | 208.3 | 56 | 56 | 56 | | | | |
| | IBX | 332.4 | 166.2 | | | | 56 | 56 | 56 | 56 |
| | ACMO | 141.2 | 141.2 | | | | | | | |
| | FA-513AS | 206.3 | 206.3 | | | | | | | |
| | SR789 | 220.3 | 220.3 | | | | | | | |
| | tBCH | 210.3 | 210.3 | | | | | | | |
| | LA | 240.4 | 240.4 | | | | | | | |
| | 4HBA | 144.2 | 144.2 | | | | | | | |
| | PO-A | 192.2 | 192.2 | | | | | | | |
| | DHD-A | 464.8 | 464.8 | | | | | | | |
| | HOA(N) | 116.1 | 116.1 | | | | | | | |
| | HOA-MS(N) | 216.2 | 216.2 | | | | | | | |
| | BAA | 215.3 | 215.3 | | | | | | | |
| | EEEA | 188.2 | 188.2 | | | | | | | |
| | THF(1000) | 170.2 | 170.2 | | | | | | | |
| Difunctional monomer | DCPA | 304.4 | 152.2 | | | | | | | |
| | DCP | 332.4 | 166.2 | | | | 24 | | | |
| | 1.6HX | 254.3 | 127.2 | | | | | 24 | | |
| | A-NOD-N | 282.4 | 141.2 | | | | | | | |
| | EG | 198.2 | 99.1 | | | | | | | |
| | 3EG | 286.3 | 143.2 | 24 | | | | | 24 | |
| | BP2EM | 479.0 | 239.5 | | 24 | | | | | |
| | G101P | 228.2 | 114.1 | | | 24 | | | | |
| | A-DOG | 326.4 | 163.2 | | | | | | | |
| | FA-222 | 214.2 | 107.1 | | | | | | | |
| | APG-100 | 242.3 | 121.1 | | | | | | | |
| | 3EG-A | 258.3 | 129.1 | | | | | | | |
| | HBPE-4 | 524.7 | 262.3 | | | | | | | |
| | G201P | 214.2 | 107.1 | | | | | | | 24 |
| | UDMA | 470.6 | 235.3 | | | | | | | |
| | FA240A | 522.6 | 261.3 | | | | | | | |
| | FAP240A | 532.7 | 266.3 | | | | | | | |
| | APG700 | 823.1 | 411.5 | | | | | | | |
| | ABPE10 | 776.9 | 388.4 | | | | | | | |

TABLE 2-continued

| | | Mw | AEw | | | | | | | |
|---|---|---|---|---|---|---|---|---|---|---|
| Photopolymerization initiator | TPO | — | — | 2 | 2 | 2 | 2 | 2 | 2 | 2 |
| | 379 | — | — | | | | | | | |
| | 819 | — | — | | | | | | | |
| Total | | | | 102 | 102 | 102 | 102 | 102 | 102 | 102 |
| Content of (meth)acryloyl group (mol/g) × 1000 | | | | 4.28 | 3.62 | 4.70 | 4.72 | 5.15 | 4.95 | 5.50 |
| Minimum value of storage elastic modulus [$\times 10^7$ Pa] | | | | 0.60 | 0.37 | 0.64 | 0.40 | 1.14 | 1.05 | 1.16 |
| Storage elastic modulus at 25° C. [$\times 10^9$ Pa] | | | | 2.31 | 2.70 | 1.94 | 2.12 | 2.23 | 2.29 | 2.27 |
| Heating test | | | | OK | OK | OK | OK | OK | OK | OK |
| Surface of article | | | | ○ | ○ | ○ | Δ | Δ | Δ | Δ |
| Accuracy of article | | | | ○ | ○ | ○ | ○ | ○ | ○ | ○ |
| Evaluation of cast | | | | Δ | ○ | Δ | ○ | Δ | Δ | Δ |

| | | | | Example | | | | | |
|---|---|---|---|---|---|---|---|---|---|
| | | Mw | AEw | 22 | 23 | 24 | 25 | 26 | 27 |
| Thermoplastic component | P90 | — | — | 20 | | 20 | | 20 | |
| | P140 | — | — | | | | | | |
| | M90 | — | — | | 20 | | 20 | | |
| | k100 | — | — | | | | | | 20 |
| Monofunctional monomer | IBXA | 208.3 | 208.3 | | | | | | |
| | IBX | 332.4 | 166.2 | | | | | | 56 |
| | ACMO | 141.2 | 141.2 | | | | | | |
| | FA-513AS | 206.3 | 206.3 | | | | | | |
| | SR789 | 220.3 | 220.3 | | | | | | |
| | tBCH | 210.3 | 210.3 | | | 56 | 56 | 56 | |
| | LA | 240.4 | 240.4 | 56 | 56 | | | | |
| | 4HBA | 144.2 | 144.2 | | | | | | |
| | PO-A | 192.2 | 192.2 | | | | | | |
| | DHD-A | 464.8 | 464.8 | | | | | | |
| | HOA(N) | 116.1 | 116.1 | | | | | | |
| | HOA-MS(N) | 216.2 | 216.2 | | | | | | |
| | BAA | 215.3 | 215.3 | | | | | | |
| | EEEA | 188.2 | 188.2 | | | | | | |
| | THF(1000) | 170.2 | 170.2 | | | | | | |
| Difunctional monomer | DCPA | 304.4 | 152.2 | | | | | 24 | |
| | DCP | 332.4 | 166.2 | | 24 | 24 | 24 | | 24 |
| | 1.6HX | 254.3 | 127.2 | | | | | | |
| | A-NOD-N | 282.4 | 141.2 | | | | | | |
| | EG | 198.2 | 99.1 | | | | | | |
| | 3EG | 286.3 | 143.2 | | | | | | |
| | BP2EM | 479.0 | 239.5 | 24 | | | | | |
| | G101P | 228.2 | 114.1 | | | | | | |
| | A-DOG | 326.4 | 163.2 | | | | | | |
| | FA-222 | 214.2 | 107.1 | | | | | | |
| | APG-100 | 242.3 | 121.1 | | | | | | |
| | 3EG-A | 258.3 | 129.1 | | | | | | |
| | HBPE-4 | 524.7 | 262.3 | | | | | | |
| | G201P | 214.2 | 107.1 | | | | | | |
| | UDMA | 470.6 | 235.3 | | | | | | |
| | FA240A | 522.6 | 261.3 | | | | | | |
| | FAP240A | 532.7 | 266.3 | | | | | | |
| | APG700 | 823.1 | 411.5 | | | | | | |
| | ABPE10 | 776.9 | 388.4 | | | | | | |
| Photopolymerization initiator | TPO | — | — | 2 | 2 | 2 | 2 | 2 | 2 |
| | 379 | — | — | | | | | | |
| | 819 | — | — | | | | | | |
| Total | | | | 102 | 102 | 102 | 102 | 102 | 102 |
| Content of (meth)acryloyl group (mol/g) × 1000 | | | | 3.27 | 3.70 | 4.03 | 4.03 | 4.16 | 4.72 |
| Minimum value of storage elastic modulus [$\times 10^7$ Pa] | | | | 0.54 | 0.53 | 0.55 | 0.55 | 0.55 | 0.55 |
| Storage elastic modulus at 25° C. [$\times 10^9$ Pa] | | | | 1.16 | 0.87 | 1.89 | 1.17 | 1.89 | 1.19 |
| Heating test | | | | OK | OK | OK | OK | OK | OK |
| Surface of article | | | | ○ | ○ | ○ | ○ | ○ | ○ |
| Accuracy of article | | | | Δ | Δ | ○ | Δ | ○ | Δ |
| Evaluation of cast | | | | ○ | ○ | Δ | Δ | Δ | Δ |

TABLE 3

| | | Mw | AEw | Comparative Example 2 | Example 28 | 29 | 30 | 31 | 32 | 33 | 34 |
|---|---|---|---|---|---|---|---|---|---|---|---|
| Alcohol or alcohol derivative | PEG 1000 | — | — | | 20 | 20 | 10 | 30 | 15 | | |
| | PEG 200 | — | — | | | | | | | 15 | 30 |
| | PEG 6000 | — | — | | | | | | | | |
| | PPG D1000 | — | — | | | | | | | | |
| | PPG T700 | — | — | | | | | | | | |
| | PTMG 650 | — | — | | | | | | | | |
| | PTMG 1000 | — | — | | | | | | | | |
| | PTMG 2000 | — | — | | | | | | | | |
| | PEGDM 250 | — | — | | | | | | | | |
| | PEGDM 1000 | — | — | | | | | | | | |
| | Glycerin | — | — | | | | | | | | |
| | Diglycerin | — | — | | | | | | | | |
| | DBDG | — | — | | | | | | | | |
| | Lauryl alcohol | — | — | | | | | | | | |
| | NEWCOL 3-80 | — | — | | | | | | | | |
| | NEWCOL 80 | — | — | | | | | | | | |
| | NEWCOL 2300-FE | — | — | | | | | | | | |
| | NEWCOL 2309-FZ | — | — | | | | | | | | |
| Monofunctional monomer | IBXA | 208.3 | 208.3 | | | | | 55 | 65 | | |
| | IBX | 332.4 | 166.2 | | | | | | | | |
| | ACMO | 141.2 | 141.2 | 60 | 60 | 60 | 70 | | | 65 | 55 |
| | FA-513AS | 206.3 | 206.3 | | | | | | | | |
| | SR789 | 220.3 | 220.3 | | | | | | | | |
| | tBCH | 210.3 | 210.3 | | | | | | | | |
| | LA | 240.4 | 240.4 | | | | | | | | |
| | 4HBA | 144.2 | 144.2 | | | | | | | | |
| | PO-A | 192.2 | 192.2 | | | | | | | | |
| | DHD-A | 464.8 | 464.8 | | | | | | | | |
| | HOA(N) | 116.1 | 116.1 | | | | | | | | |
| | HOA-MS(N) | 216.2 | 216.2 | | | | | | | | |
| | BAA | 215.3 | 215.3 | | | | | | | | |
| | EEEA | 188.2 | 188.2 | | | | | | | | |
| | THF(1000) | 170.2 | 170.2 | | | | | | | | |
| Difunctional monomer | DCPA | 304.4 | 152.2 | 40 | 20 | | | | | | |
| | DCP | 332.4 | 166.2 | | | | | | | | |
| | 1.6HX | 254.3 | 127.2 | | | | | | | | |
| | A-NOD-N | 282.4 | 141.2 | | | | | | | | |
| | EG | 198.2 | 99.1 | | | | | | | | |
| | 3EG | 286.3 | 143.2 | | | | | | | | |
| | BP2EM | 479.0 | 239.5 | | | | | | | | |
| | G101P | 228.2 | 114.1 | | | | | | | | |
| | A-DOG | 326.4 | 163.2 | | | 20 | 20 | 15 | | 20 | 15 |
| | FA-222 | 214.2 | 107.1 | | | | | | | | |
| | APG-100 | 242.3 | 121.1 | | | | | | | | |
| | 3EG-A | 258.3 | 129.1 | | | | | | 20 | | |
| | HBPE-4 | 524.7 | 262.3 | | | | | | | | |
| | G201P | 214.2 | 107.1 | | | | | | | | |
| | UDMA | 470.6 | 235.3 | | | | | | | | |
| | FA240A | 522.6 | 261.3 | | | | | | | | |
| | FAP240A | 532.7 | 266.3 | | | | | | | | |
| | APG700 | 823.1 | 411.5 | | | | | | | | |
| | ABPE10 | 776.9 | 388.4 | | | | | | | | |
| Photopolymerization initiator | TPO | — | — | 2 | 2 | 2 | 2 | 2 | 2 | 2 | 2 |
| | 379 | — | — | | | | | | | | |
| | 819 | — | — | | | | | | | | |
| Total | | | | 102 | 102 | 102 | 102 | 102 | 102 | 102 | 102 |
| Content of (meth)acryloyl group (mol/g) × 1000 | | | | 6.74 | 5.46 | 5.37 | 6.06 | 3.49 | 4.58 | 5.72 | 4.72 |
| Minimum value of storage elastic modulus [$\times 10^7$ Pa] | | | | 3.45 | 0.78 | 0.89 | 0.98 | 0.75 | 0.85 | 1.00 | 0.75 |
| Storage elastic modulus at 25° C. [$\times 10^9$ Pa] | | | | 2.82 | 1.54 | 1.62 | 1.78 | 1.49 | 1.49 | 1.58 | 1.47 |
| Heating test | | | | NG | OK | OK | OK | OK | OK | OK | OK |
| Surface of article | | | | ○ | ○ | ○ | ○ | Δ | ○ | Δ | Δ |
| Accuracy of article | | | | ○ | ○ | ○ | ○ | ○ | ○ | ○ | ○ |
| Evaluation of cast | | | | — | ○ | Δ | Δ | ○ | Δ | Δ | ○ |

| | | Mw | AEw | Example 35 | 36 | 37 | 38 | 39 | 40 | 41 |
|---|---|---|---|---|---|---|---|---|---|---|
| Alcohol or alcohol derivative | PEG 1000 | — | — | | | | | | | |
| | PEG 200 | — | — | | | | | | | |
| | PEG 6000 | — | — | 15 | | | | | | |
| | PPG D1000 | — | — | | 20 | 20 | 10 | 40 | 20 | 15 |
| | PPG T700 | — | — | | | | | | | |
| | PTMG 650 | — | — | | | | | | | |

TABLE 3-continued

| | | | | | | | | | | |
|---|---|---|---|---|---|---|---|---|---|---|
| | PTMG 1000 | — | — | | | | | | | |
| | PTMG 2000 | — | — | | | | | | | |
| | PEGDM 250 | — | — | | | | | | | |
| | PEGDM 1000 | — | — | | | | | | | |
| | Glycerin | — | — | | | | | | | |
| | Diglycerin | — | — | | | | | | | |
| | DBDG | — | — | | | | | | | |
| | Lauryl alcohol | — | — | | | | | | | |
| | NEWCOL 3-80 | — | — | | | | | | | |
| | NEWCOL 80 | — | — | | | | | | | |
| | NEWCOL 2300-FE | — | — | | | | | | | |
| | NEWCOL 2309-FZ | — | — | | | | | | | |
| Monofunctional monomer | IBXA | 208.3 | 208.3 | | 60 | 60 | 70 | 50 | 60 | 65 |
| | IBX | 332.4 | 166.2 | | | | | | | |
| | ACMO | 141.2 | 141.2 | 70 | | | | | | |
| | FA-513AS | 206.3 | 206.3 | | | | | | | |
| | SR789 | 220.3 | 220.3 | | | | | | | |
| | tBCH | 210.3 | 210.3 | | | | | | | |
| | LA | 240.4 | 240.4 | | | | | | | |
| | 4HBA | 144.2 | 144.2 | | | | | | | |
| | PO-A | 192.2 | 192.2 | | | | | | | |
| | DHD-A | 464.8 | 464.8 | | | | | | | |
| | HOA(N) | 116.1 | 116.1 | | | | | | | |
| | HOA-MS(N) | 216.2 | 216.2 | | | | | | | |
| | BAA | 215.3 | 215.3 | | | | | | | |
| | EEEA | 188.2 | 188.2 | | | | | | | |
| | THF(1000) | 170.2 | 170.2 | | | | | | | |
| Difunctional monomer | DCPA | 304.4 | 152.2 | | | | | 10 | 20 | 20 |
| | DCP | 332.4 | 166.2 | | | | | | | |
| | 1.6HX | 254.3 | 127.2 | | | | | | | |
| | A-NOD-N | 282.4 | 141.2 | | | | | | | |
| | EG | 198.2 | 99.1 | | | | | | | |
| | 3EG | 286.3 | 143.2 | | | | | | | |
| | BP2EM | 479.0 | 239.5 | | | | | | | |
| | G101P | 228.2 | 114.1 | | | | | | | |
| | A-DOG | 326.4 | 163.2 | 15 | 20 | | | | | |
| | FA-222 | 214.2 | 107.1 | | | | 20 | | | |
| | APG-100 | 242.3 | 121.1 | | | | | | | |
| | 3EG-A | 258.3 | 129.1 | | | 20 | | | | |
| | HBPE-4 | 524.7 | 262.3 | | | | | | | |
| | G201P | 214.2 | 107.1 | | | | | | | |
| | UDMA | 470.6 | 235.3 | | | | | | | |
| | FA240A | 522.6 | 261.3 | | | | | | | |
| | FAP240A | 532.7 | 266.3 | | | | | | | |
| | APG700 | 823.1 | 411.5 | | | | | | | |
| | ABPE10 | 776.9 | 388.4 | | | | | | | |
| Photopolymerization initiator | TPO | — | — | 2 | 2 | 2 | 2 | 2 | 2 | 2 |
| | 379 | — | — | | | | | | | |
| | 819 | — | — | | | | | | | |
| Total | | | | 102 | 102 | 102 | 102 | 102 | 102 | 102 |
| Content of (meth)acryloyl group (mol/g) × 1000 | | | | 5.76 | 4.03 | 4.34 | 5.13 | 3.00 | 4.11 | 4.35 |
| Minimum value of storage elastic modulus [$\times 10^7$ Pa] | | | | 1.00 | 0.85 | 0.67 | 1.12 | 0.26 | 0.63 | 0.72 |
| Storage elastic modulus at 25° C. [$\times 10^9$ Pa] | | | | 1.58 | 1.22 | 0.86 | 2.68 | 0.85 | 1.47 | 1.71 |
| Heating test | | | | OK | OK | OK | OK | OK | OK | OK |
| Surface of article | | | | ○ | ○ | ○ | ○ | Δ | ○ | ○ |
| Accuracy of article | | | | ○ | Δ | Δ | ○ | Δ | ○ | ○ |
| Evaluation of cast | | | | Δ | Δ | ○ | Δ | ○ | ○ | ○ |

TABLE 4

| | | | | Example | | | | | | | | |
|---|---|---|---|---|---|---|---|---|---|---|---|---|
| | | Mw | AEw | 42 | 43 | 44 | 45 | 46 | 47 | 48 | 49 | 50 |
| Alcohol or alcohol derivative | PEG 1000 | — | — | | | | | | | | | |
| | PEG 200 | — | — | | | | | | | | | |
| | PEG 6000 | — | — | | | | | | | | | |
| | PPG D1000 | — | — | 20 | 20 | 15 | 25 | 20 | 30 | | | |
| | PPG T700 | — | — | | | | | | | 15 | 30 | |
| | PTMG 650 | — | — | | | | | | | | | 20 |
| | PTMG 1000 | — | — | | | | | | | | | |
| | PTMG 2000 | — | — | | | | | | | | | |
| | PEGDM 250 | — | — | | | | | | | | | |
| | PEGDM 1000 | — | — | | | | | | | | | |
| | Glycerin | — | — | | | | | | | | | |
| | Diglycerin | — | — | | | | | | | | | |

TABLE 4-continued

| | | | | | | | | | | | | |
|---|---|---|---|---|---|---|---|---|---|---|---|---|
| | DBDG | — | — | | | | | | | | | |
| | Lauryl alcohol | — | — | | | | | | | | | |
| | NEWCOL 3-80 | — | — | | | | | | | | | |
| | NEWCOL 80 | — | — | | | | | | | | | |
| | NEWCOL 2300-FE | — | — | | | | | | | | | |
| | NEWCOL 2309-FZ | — | — | | | | | | | | | |
| Monofunctional monomer | IBXA | 208.3 | 208.3 | | | 65 | | | | 65 | 55 | 60 |
| | IBX | 332.4 | 166.2 | | | | 50 | 50 | 45 | | | |
| | ACMO | 141.2 | 141.2 | | | | | | | | | |
| | FA-513AS | 206.3 | 206.3 | 60 | | | | | | | | |
| | SR789 | 220.3 | 220.3 | | 60 | | | | | | | |
| | tBCH | 210.3 | 210.3 | | | | | | | | | |
| | LA | 240.4 | 240.4 | | | | | | | | | |
| | 4HBA | 144.2 | 144.2 | | | | | | | | | |
| | PO-A | 192.2 | 192.2 | | | | | | | | | |
| | DHD-A | 464.8 | 464.8 | | | | | | | | | |
| | HOA(N) | 116.1 | 116.1 | | | | | | | | | |
| | HOA-MS(N) | 216.2 | 216.2 | | | | | | | | | |
| | BAA | 215.3 | 215.3 | | | | | | | | | |
| | EEEA | 188.2 | 188.2 | | | | | | | | | |
| | THF(1000) | 170.2 | 170.2 | | | | | | | | | |
| Difunctional monomer | DCPA | 304.4 | 152.2 | | 20 | | | | | | | 20 |
| | DCP | 332.4 | 166.2 | | | | | | | | | |
| | 1.6HX | 254.3 | 127.2 | | | | | | | | | |
| | A-NOD-N | 282.4 | 141.2 | | | | | | | | | |
| | EG | 198.2 | 99.1 | | | | | | | | | |
| | 3EG | 286.3 | 143.2 | | | | | | | | | |
| | BP2EM | 479.0 | 239.5 | | | | | | | | | |
| | G101P | 228.2 | 114.1 | | | | | | | | | |
| | A-DOG | 326.4 | 163.2 | 20 | | | | | | 20 | 15 | |
| | FA-222 | 214.2 | 107.1 | | | | | | | | | |
| | APG-100 | 242.3 | 121.1 | | | | | | | | | |
| | 3EG-A | 258.3 | 129.1 | | | | | | | | | |
| | HBPE-4 | 524.7 | 262.3 | | | | | | | | | |
| | G201P | 214.2 | 107.1 | | | | | | | | | |
| | UDMA | 470.6 | 235.3 | | | 20 | 25 | 30 | 25 | | | |
| | FA240A | 522.6 | 261.3 | | | | | | | | | |
| | FAP240A | 532.7 | 266.3 | | | | | | | | | |
| | APG700 | 823.1 | 411.5 | | | | | | | | | |
| | ABPE10 | 776.9 | 388.4 | | | | | | | | | |
| Photopolymerization initiator | TPO | — | — | 2 | 2 | 2 | | | | 2 | 2 | 2 |
| | 379 | — | — | | | | | | | | | |
| | 819 | — | — | | | | 2 | 2 | 2 | | | |
| Total | | | | 102 | 102 | 102 | 102 | 102 | 102 | 102 | 102 | 102 |
| Content of (meth)acryloyl group (mol/g) × 1000 | | | | 4.05 | 3.96 | 3.89 | 3.99 | 4.20 | 3.70 | 4.26 | 3.49 | 4.11 |
| Minimum value of storage elastic modulus [$\times 10^7$ Pa] | | | | 0.62 | 0.56 | 0.29 | 0.30 | 0.53 | 0.25 | 0.99 | 0.24 | 0.51 |
| Storage elastic modulus at 25° C. [$\times 10^9$ Pa] | | | | 1.36 | 1.24 | 1.57 | 1.25 | 1.49 | 0.84 | 1.29 | 0.80 | 1.50 |
| Heating test | | | | OK | OK | OK | OK | OK | OK | OK | OK | OK |
| Surface of article | | | | ○ | ○ | ○ | ○ | ○ | Δ | ○ | Δ | ○ |
| Accuracy of article | | | | Δ | Δ | ○ | Δ | ○ | Δ | Δ | Δ | ○ |
| Evaluation of cast | | | | ○ | ○ | ○ | ○ | ○ | ○ | Δ | ○ | ○ |

| | | | | Example | | | | | | |
|---|---|---|---|---|---|---|---|---|---|---|
| | | Mw | AEw | 51 | 52 | 53 | 54 | 55 | 56 | 57 |
| Alcohol or alcohol derivative | PEG 1000 | — | — | | | | | | | |
| | PEG 200 | — | — | | | | | | | |
| | PEG 6000 | — | — | | | | | | | |
| | PPG D1000 | — | — | | | | | | | |
| | PPG T700 | — | — | | | | | | | |
| | PTMG 650 | — | — | | | | | | | |
| | PTMG 1000 | — | — | 20 | 20 | 20 | 25 | 25 | 25 | 25 |
| | PTMG 2000 | — | — | | | | | | | |
| | PEGDM 250 | — | — | | | | | | | |
| | PEGDM 1000 | — | — | | | | | | | |
| | Glycerin | — | — | | | | | | | |
| | Diglycerin | — | — | | | | | | | |
| | DBDG | — | — | | | | | | | |
| | Lauryl alcohol | — | — | | | | | | | |
| | NEWCOL 3-80 | — | — | | | | | | | |
| | NEWCOL 80 | — | — | | | | | | | |
| | NEWCOL 2300-FE | — | — | | | | | | | |
| | NEWCOL 2309-FZ | — | — | | | | | | | |

TABLE 4-continued

| | | | | | | | | | | |
|---|---|---|---|---|---|---|---|---|---|---|
| Monofunctional monomer | IBXA | 208.3 | 208.3 | 60 | 60 | 60 | | | | |
| | IBX | 332.4 | 166.2 | | | | | | | |
| | ACMO | 141.2 | 141.2 | | | | | | | |
| | FA-513AS | 206.3 | 206.3 | | | | 60 | 60 | 60 | |
| | SR789 | 220.3 | 220.3 | | | | | | | |
| | tBCH | 210.3 | 210.3 | | | | | | | 60 |
| | LA | 240.4 | 240.4 | | | | | | | |
| | 4HBA | 144.2 | 144.2 | | | | | | | |
| | PO-A | 192.2 | 192.2 | | | | | | | |
| | DHD-A | 464.8 | 464.8 | | | | | | | |
| | HOA(N) | 116.1 | 116.1 | | | | | | | |
| | HOA-MS(N) | 216.2 | 216.2 | | | | | | | |
| | BAA | 215.3 | 215.3 | | | | | | | |
| | EEEA | 188.2 | 188.2 | | | | | | | |
| | THF(1000) | 170.2 | 170.2 | | | | | | | |
| Difunctional monomer | DCPA | 304.4 | 152.2 | 20 | | | | | | |
| | DCP | 332.4 | 166.2 | | | | | | | |
| | 1.6HX | 254.3 | 127.2 | | | | | | | |
| | A-NOD-N | 282.4 | 141.2 | | | | | | | |
| | EG | 198.2 | 99.1 | | | | | | | |
| | 3EG | 286.3 | 143.2 | | | | | | | |
| | BP2EM | 479.0 | 239.5 | | | | | | | |
| | G101P | 228.2 | 114.1 | | | | | | | |
| | A-DOG | 326.4 | 163.2 | | 20 | | | | | |
| | FA-222 | 214.2 | 107.1 | | | | | | | |
| | APG-100 | 242.3 | 121.1 | | | 20 | | | | |
| | 3EG-A | 258.3 | 129.1 | | | | 15 | | | |
| | HBPE-4 | 524.7 | 262.3 | | | | | 15 | | 15 |
| | G201P | 214.2 | 107.1 | | | | | | 15 | |
| | UDMA | 470.6 | 235.3 | | | | | | | |
| | FA240A | 522.6 | 261.3 | | | | | | | |
| | FAP240A | 532.7 | 266.3 | | | | | | | |
| | APG700 | 823.1 | 411.5 | | | | | | | |
| | ABPE10 | 776.9 | 388.4 | | | | | | | |
| Photopolymerization initiator | TPO | — | — | 2 | 2 | 2 | 2 | 2 | 2 | 2 |
| | 379 | — | — | | | | | | | |
| | 819 | — | — | | | | | | | |
| Total | | | | 102 | 102 | 102 | 102 | 102 | 102 | 102 |
| Content of (meth)acryloyl group (mol/g) × 1000 | | | | 4.11 | 4.03 | 4.44 | 3.99 | 3.41 | 4.22 | 3.36 |
| Minimum value of storage elastic modulus [$\times 10^7$ Pa] | | | | 0.38 | 0.54 | 0.44 | 0.42 | 0.28 | 0.43 | 0.28 |
| Storage elastic modulus at 25° C. [$\times 10^9$ Pa] | | | | 1.49 | 1.45 | 1.31 | 1.24 | 0.66 | 1.26 | 0.67 |
| Heating test | | | | OK | OK | OK | OK | OK | OK | OK |
| Surface of article | | | | ○ | ○ | ○ | ○ | ○ | ○ | ○ |
| Accuracy of article | | | | ○ | ○ | Δ | Δ | Δ | Δ | Δ |
| Evaluation of cast | | | | ○ | ○ | ○ | ○ | ○ | ○ | ○ |

TABLE 5

| | | | | Example | | | | | | | | |
|---|---|---|---|---|---|---|---|---|---|---|---|---|
| | | Mw | AEw | 58 | 59 | 60 | 61 | 62 | 63 | 64 | 65 | 66 |
| Alcohol or alcohol derivative | PEG 1000 | — | — | | | | | | | | | |
| | PEG 200 | — | — | | | | | | | | | |
| | PEG 6000 | — | — | | | | | | | | | |
| | PPG D1000 | — | — | | | | | | | | | |
| | PPG T700 | — | — | | | | | | | | | |
| | PTMG 650 | — | — | | | | | | | | | |
| | PTMG 1000 | — | — | | | | | | | | | |
| | PTMG 2000 | — | — | 25 | 25 | | | | | | | |
| | PEGDM 250 | — | — | | | 25 | | | | | | |
| | PEGDM 1000 | — | — | | | | 25 | | | | | |
| | Glycerin | — | — | | | | | 10 | 30 | | | |
| | Diglycerin | — | — | | | | | | | 10 | 30 | |
| | DBDG | — | — | | | | | | | | | 10 |
| | Lauryl alcohol | — | — | | | | | | | | | |
| | NEWCOL 3-80 | — | — | | | | | | | | | |
| | NEWCOL 80 | — | — | | | | | | | | | |
| | NEWCOL 2300-FE | — | — | | | | | | | | | |
| | NEWCOL 2309-FZ | — | — | | | | | | | | | |

TABLE 5-continued

| | | | | | | | | | | | | |
|---|---|---|---|---|---|---|---|---|---|---|---|---|
| Monofunctional monomer | IBXA | 208.3 | 208.3 | | | | | | | | | |
| | IBX | 332.4 | 166.2 | | | | | | | | | |
| | ACMO | 141.2 | 141.2 | | | | | | | | | |
| | FA-513AS | 206.3 | 206.3 | | | | | | | | | |
| | SR789 | 220.3 | 220.3 | | | | | | | | | |
| | tBCH | 210.3 | 210.3 | 55 | 55 | 55 | 55 | 65 | 55 | 65 | 50 | 65 |
| | LA | 240.4 | 240.4 | | | | | | | | | |
| | 4HBA | 144.2 | 144.2 | | | | | | | | | |
| | PO-A | 192.2 | 192.2 | | | | | | | | | |
| | DHD-A | 464.8 | 464.8 | | | | | | | | | |
| | HOA(N) | 116.1 | 116.1 | | | | | | | | | |
| | HOA-MS(N) | 216.2 | 216.2 | | | | | | | | | |
| | BAA | 215.3 | 215.3 | | | | | | | | | |
| | EEEA | 188.2 | 188.2 | | | | | | | | | |
| | THF(1000) | 170.2 | 170.2 | | | | | | | | | |
| Difunctional monomer | DCPA | 304.4 | 152.2 | | | 20 | 20 | | | | | |
| | DCP | 332.4 | 166.2 | | | | | | | | | |
| | 1.6HX | 254.3 | 127.2 | | | | | | | | | |
| | A-NOD-N | 282.4 | 141.2 | | | | | | | | | |
| | EG | 198.2 | 99.1 | | | | | | | | | |
| | 3EG | 286.3 | 143.2 | | | | | | | | | |
| | BP2EM | 479.0 | 239.5 | | | | | | | | | |
| | G101P | 228.2 | 114.1 | | | | | | | | | |
| | A-DOG | 326.4 | 163.2 | 20 | | | | 25 | 15 | 25 | 20 | |
| | FA-222 | 214.2 | 107.1 | | | | | | | | | 25 |
| | APG-100 | 242.3 | 121.1 | | | | | | | | | |
| | 3EG-A | 258.3 | 129.1 | | | | | | | | | |
| | HBPE-4 | 524.7 | 262.3 | | | | | | | | | |
| | G201P | 214.2 | 107.1 | | 20 | | | | | | | |
| | UDMA | 470.6 | 235.3 | | | | | | | | | |
| | FA240A | 522.6 | 261.3 | | | | | | | | | |
| | FAP240A | 532.7 | 266.3 | | | | | | | | | |
| | APG700 | 823.1 | 411.5 | | | | | | | | | |
| | ABPE10 | 776.9 | 388.4 | | | | | | | | | |
| Photopolymerization initiator | TPO | — | — | 2 | 2 | 2 | 2 | 2 | 2 | 2 | 2 | 2 |
| | 379 | — | — | | | | | | | | | |
| | 819 | — | — | | | | | | | | | |
| Total | | | | 102 | 102 | 102 | 102 | 102 | 102 | 102 | 102 | 102 |
| Content of (meth)acryloyl group (mol/g) × 1000 | | | | 3.77 | 4.39 | 3.85 | 3.85 | 4.53 | 3.47 | 4.53 | 3.53 | 5.32 |
| Minimum value of storage elastic modulus [$\times 10^7$ Pa] | | | | 0.29 | 0.78 | 1.15 | 0.64 | 0.93 | 0.25 | 1.15 | 0.30 | 1.14 |
| Storage elastic modulus at 25° C. [$\times 10^9$ Pa] | | | | 0.70 | 1.83 | 1.80 | 1.65 | 1.63 | 0.83 | 2.76 | 0.72 | 1.87 |
| Heating test | | | | OK | OK | OK | OK | OK | OK | OK | OK | OK |
| Surface of article | | | | ○ | ○ | Δ | ○ | Δ | Δ | Δ | Δ | Δ |
| Accuracy of article | | | | Δ | ○ | ○ | ○ | ○ | Δ | ○ | Δ | ○ |
| Evaluation of cast | | | | ○ | ○ | Δ | ○ | Δ | ○ | Δ | ○ | Δ |

| | | | | Example | | | | | | |
|---|---|---|---|---|---|---|---|---|---|---|
| | | Mw | AEw | 67 | 68 | 69 | 70 | 71 | 72 | 73 |
| Alcohol or alcohol derivative | PEG 1000 | — | — | | | | | | | |
| | PEG 200 | — | — | | | | | | | |
| | PEG 6000 | — | — | | | | | | | |
| | PPG D1000 | — | — | | | | | | | |
| | PPG T700 | — | — | | | | | | | |
| | PTMG 650 | — | — | | | | | | | |
| | PTMG 1000 | — | — | | | | | | | |
| | PTMG 2000 | — | — | | | | | | | |
| | PEGDM 250 | — | — | | | | | | | |
| | PEGDM 1000 | — | — | | | | | | | |
| | Glycerin | — | — | | | | | | | |
| | Diglycerin | — | — | | | | | | | |
| | DBDG | — | — | 30 | | | | | | |
| | Lauryl alcohol | — | — | | 10 | 30 | | | | |
| | NEWCOL 3-80 | — | — | | | | 15 | | | |
| | NEWCOL 80 | — | — | | | | | 15 | | |
| | NEWCOL 2300-FE | — | — | | | | | | 15 | |
| | NEWCOL 2309-FZ | — | — | | | | | | | 15 |
| Monofunctional monomer | IBXA | 208.3 | 208.3 | | | | 65 | 65 | 65 | 65 |
| | IBX | 332.4 | 166.2 | | | | | | | |
| | ACMO | 141.2 | 141.2 | | | | | | | |
| | FA-513AS | 206.3 | 206.3 | | | | | | | |
| | SR789 | 220.3 | 220.3 | | | | | | | |
| | tBCH | 210.3 | 210.3 | 55 | 65 | 55 | | | | |
| | LA | 240.4 | 240.4 | | | | | | | |
| | 4HBA | 144.2 | 144.2 | | | | | | | |
| | PO-A | 192.2 | 192.2 | | | | | | | |
| | DHD-A | 464.8 | 464.8 | | | | | | | |
| | HOA(N) | 116.1 | 116.1 | | | | | | | |

TABLE 5-continued

| | | | | | | | | | | |
|---|---|---|---|---|---|---|---|---|---|---|
| | HOA-MS(N) | 216.2 | 216.2 | | | | | | | |
| | BAA | 215.3 | 215.3 | | | | | | | |
| | EEEA | 188.2 | 188.2 | | | | | | | |
| | THF(1000) | 170.2 | 170.2 | | | | | | | |
| Difunctional monomer | DCPA | 304.4 | 152.2 | | | | 20 | 20 | 20 | 20 |
| | DCP | 332.4 | 166.2 | | | | | | | |
| | 1.6HX | 254.3 | 127.2 | | | | | | | |
| | A-NOD-N | 282.4 | 141.2 | | | | | | | |
| | EG | 198.2 | 99.1 | | | | | | | |
| | 3EG | 286.3 | 143.2 | | | | | | | |
| | BP2EM | 479.0 | 239.5 | | | | | | | |
| | G101P | 228.2 | 114.1 | | | | | | | |
| | A-DOG | 326.4 | 163.2 | | | | | | | |
| | FA-222 | 214.2 | 107.1 | 15 | 25 | 15 | | | | |
| | APG-100 | 242.3 | 121.1 | | | | | | | |
| | 3EG-A | 258.3 | 129.1 | | | | | | | |
| | HBPE-4 | 524.7 | 262.3 | | | | | | | |
| | G201P | 214.2 | 107.1 | | | | | | | |
| | UDMA | 470.6 | 235.3 | | | | | | | |
| | FA240A | 522.6 | 261.3 | | | | | | | |
| | FAP240A | 532.7 | 266.3 | | | | | | | |
| | APG700 | 823.1 | 411.5 | | | | | | | |
| | ABPE10 | 776.9 | 388.4 | | | | | | | |
| Photopolymerization initiator | TPO | — | — | 2 | 2 | 2 | 2 | 2 | 2 | 2 |
| | 379 | — | — | | | | | | | |
| | 819 | — | — | | | | | | | |
| Total | | | | 102 | 102 | 102 | 102 | 102 | 102 | 102 |
| Content of (meth)acryloyl group (mol/g) × 1000 | | | | 3.94 | 5.32 | 3.94 | 4.35 | 4.35 | 4.35 | 4.35 |
| Minimum value of storage elastic modulus [$\times 10^7$ Pa] | | | | 0.30 | 0.91 | 0.29 | 0.64 | 0.65 | 0.86 | 0.65 |
| Storage elastic modulus at 25° C. [$\times 10^9$ Pa] | | | | 0.71 | 1.11 | 0.71 | 1.69 | 1.81 | 1.46 | 1.60 |
| Heating test | | | | OK | OK | OK | OK | OK | OK | OK |
| Surface of article | | | | Δ | Δ | Δ | ○ | ○ | ○ | ○ |
| Accuracy of article | | | | Δ | Δ | Δ | ○ | ○ | ○ | ○ |
| Evaluation of cast | | | | ○ | Δ | ○ | ○ | ○ | Δ | ○ |

TABLE 6

| | | | | Example | | | | | | |
|---|---|---|---|---|---|---|---|---|---|---|
| | | Mw | AEw | 74 | 75 | 76 | 77 | 78 | 79 | 80 |
| Monofunctional monomer | IBXA | 208.3 | 208.3 | 65 | 65 | 65 | 65 | 65 | 65 | 65 |
| | IBX | 332.4 | 166.2 | | | | | | | |
| | ACMO | 141.2 | 141.2 | | | | | | | |
| | FA-513AS | 206.3 | 206.3 | | | | | | | |
| | SR789 | 220.3 | 220.3 | | | | | | | |
| | tBCH | 210.3 | 210.3 | | | | | | | |
| | LA | 240.4 | 240.4 | 15 | | | | | | |
| | 4HBA | 144.2 | 144.2 | | 20 | | | | | |
| | PO-A | 192.2 | 192.2 | | | 20 | | | | |
| | DHD-A | 464.8 | 464.8 | | | | 20 | | | |
| | HOA(N) | 116.1 | 116.1 | | | | | 20 | | |
| | HOA-MS(N) | 216.2 | 216.2 | | | | | | 20 | |
| | BAA | 215.3 | 215.3 | | | | | | | 20 |
| | EEEA | 188.2 | 188.2 | | | | | | | |
| | THF(1000) | 170.2 | 170.2 | | | | | | | |
| Difunctional monomer | DCPA | 304.4 | 152.2 | 20 | 15 | 15 | 15 | 15 | 15 | 15 |
| | DCP | 332.4 | 166.2 | | | | | | | |
| | 1.6HX | 254.3 | 127.2 | | | | | | | |
| | A-NOD-N | 282.4 | 141.2 | | | | | | | |
| | EG | 198.2 | 99.1 | | | | | | | |
| | 3EG | 286.3 | 143.2 | | | | | | | |
| | BP2EM | 479.0 | 239.5 | | | | | | | |
| | G101P | 228.2 | 114.1 | | | | | | | |
| | A-DOG | 326.4 | 163.2 | | | | | | | |
| | FA-222 | 214.2 | 107.1 | | | | | | | |
| | APG-100 | 242.3 | 121.1 | | | | | | | |
| | 3EG-A | 258.3 | 129.1 | | | | | | | |
| | HBPE-4 | 524.7 | 262.3 | | | | | | | |
| | G201P | 214.2 | 107.1 | | | | | | | |
| | UDMA | 470.6 | 235.3 | | | | | | | |
| | FA240A | 522.6 | 261.3 | | | | | | | |
| | FAP240A | 532.7 | 266.3 | | | | | | | |
| | APG700 | 823.1 | 411.5 | | | | | | | |
| | ABPE10 | 776.9 | 388.4 | | | | | | | |

TABLE 6-continued

| | | | | | | | | | | |
|---|---|---|---|---|---|---|---|---|---|---|
| Photopolymerization initiator | TPO | — | — | 2 | 2 | 2 | 2 | 2 | 2 | 2 |
| | 379 | — | — | | | | | | | |
| | 819 | — | — | | | | | | | |
| Total | | | | 102 | 102 | 102 | 102 | 102 | 102 | 102 |
| Content of (meth)acryloyl group (mol/g) × 1000 | | | | 4.96 | 5.39 | 5.05 | 4.45 | 5.71 | 4.93 | 4.94 |
| Minimum value of storage elastic modulus [$\times 10^7$ Pa] | | | | 0.87 | 0.45 | 0.41 | 0.53 | 0.46 | 0.85 | 0.53 |
| Storage elastic modulus at 25° C. [$\times 10^9$ Pa] | | | | 1.44 | 1.74 | 1.93 | 1.49 | 1.92 | 2.93 | 2.25 |
| Heating test | | | | OK | OK | OK | OK | OK | OK | OK |
| Surface of article | | | | ○ | ○ | ○ | ○ | ○ | ○ | ○ |
| Accuracy of article | | | | ○ | ○ | ○ | ○ | ○ | ○ | ○ |
| Evaluation of cast | | | | Δ | ○ | ○ | ○ | ○ | Δ | ○ |

| | | | | Example | | | | | |
|---|---|---|---|---|---|---|---|---|---|
| | | Mw | AEw | 81 | 82 | 83 | 84 | 85 | 86 |
| Monofunctional monomer | IBXA | 208.3 | 208.3 | 65 | 65 | 70 | 70 | 70 | 70 |
| | IBX | 332.4 | 166.2 | | | | | | |
| | ACMO | 141.2 | 141.2 | | | | | | |
| | FA-513AS | 206.3 | 206.3 | | | | | | |
| | SR789 | 220.3 | 220.3 | | | | | | |
| | tBCH | 210.3 | 210.3 | | | | | | |
| | LA | 240.4 | 240.4 | | | | | | |
| | 4HBA | 144.2 | 144.2 | | | | | | |
| | PO-A | 192.2 | 192.2 | | | | | | |
| | DHD-A | 464.8 | 464.8 | | | | | | |
| | HOA(N) | 116.1 | 116.1 | | | | | | |
| | HOA-MS(N) | 216.2 | 216.2 | | | | | | |
| | BAA | 215.3 | 215.3 | | | | | | |
| | EEEA | 188.2 | 188.2 | 15 | | | | | |
| | THF(1000) | 170.2 | 170.2 | | 20 | | | | |
| Difunctional monomer | DCPA | 304.4 | 152.2 | 20 | 15 | 10 | 10 | 10 | 10 |
| | DCP | 332.4 | 166.2 | | | | | | |
| | 1.6HX | 254.3 | 127.2 | | | | | | |
| | A-NOD-N | 282.4 | 141.2 | | | | | | |
| | EG | 198.2 | 99.1 | | | | | | |
| | 3EG | 286.3 | 143.2 | | | | | | |
| | BP2EM | 479.0 | 239.5 | | | | | | |
| | G101P | 228.2 | 114.1 | | | | | | |
| | A-DOG | 326.4 | 163.2 | | | | | | |
| | FA-222 | 214.2 | 107.1 | | | | | | |
| | APG-100 | 242.3 | 121.1 | | | | | | |
| | 3EG-A | 258.3 | 129.1 | | | | | | |
| | HBPE-4 | 524.7 | 262.3 | | | | | | |
| | G201P | 214.2 | 107.1 | | | | | | |
| | UDMA | 470.6 | 235.3 | | | | | | |
| | FA240A | 522.6 | 261.3 | | | 20 | | | |
| | FAP240A | 532.7 | 266.3 | | | | 20 | | |
| | APG700 | 823.1 | 411.5 | | | | | 20 | |
| | ABPE10 | 776.9 | 388.4 | | | | | | 20 |
| Photopolymerization initiator | TPO | — | — | 2 | 2 | 2 | 2 | 2 | 2 |
| | 379 | — | — | | | | | | |
| | 819 | — | — | | | | | | |
| Total | | | | 102 | 102 | 102 | 102 | 102 | 102 |
| Content of (meth)acryloyl group (mol/g) × 1000 | | | | 5.13 | 4.03 | 4.69 | 4.68 | 4.42 | 4.44 |
| Minimum value of storage elastic modulus [$\times 10^7$ Pa] | | | | 1.05 | 0.56 | 1.07 | 0.94 | 0.87 | 0.88 |
| Storage elastic modulus at 25° C. [$\times 10^9$ Pa] | | | | 2.27 | 2.82 | 1.51 | 1.45 | 1.96 | 2.25 |
| Heating test | | | | OK | OK | OK | OK | OK | OK |
| Surface of article | | | | ○ | ○ | ○ | ○ | ○ | ○ |
| Accuracy of article | | | | ○ | ○ | ○ | ○ | ○ | ○ |
| Evaluation of cast | | | | Δ | ○ | Δ | Δ | Δ | Δ |

As shown in Tables 1 to 6, the plaster disposed around the cured product obtained from the curable composition of the Comparative Examples broke in the heating test, whereas the plaster disposed around the cured product obtained from the curable composition of the Examples did not break in the heating test.

As shown in Tables 1 to 6, the minimum value of the storage elastic modulus, in a range of from 25° C. to 300° C., of the cured product obtained from the curable composition of the Comparative Examples was greater than $1.20\times10^7$ Pa, whereas the minimum value of the storage elastic modulus, in a range of from 25° C. to 300° C., of the cured product obtained from the curable composition of the Examples was not greater than $1.20\times10^7$ Pa. This result indicates that breaking of the plaster around the cured product can be suppressed by regulating the minimum value of the storage elastic modulus, in a range of from 25° C. to 300° C., of the cured product to be not greater than $1.20\times10^7$ Pa.

From the comparison of the curable compositions of Examples 5 and 6, or the comparison of the curable compositions of Example 46 and 47, it is found that the curable composition in which the amount of the thermoplastic component or the alcohol is relatively small (Example 6 or Example 46) exhibits a better result in the evaluation of a surface of the article. This result indicates that the smoothness of a surface of the article can be improved by decreasing the content of a component such as the thermoplastic component or the alcohol, and increasing the content of the (meth)acrylic monomer, of the curable composition.

Further, the curable composition of Example 12, including isobornyl acrylate as a monofunctional monomer, exhibits a better result in the evaluation of a surface of the article, as compared with the curable composition of Example 20, including isobornyl methacrylate as a monofunctional monomer. This result indicates that the smoothness of a surface of the article can be improved by including an acrylic monomer, rather than a methacrylic monomer, as a monofunctional monomer.

From the results shown in Tables 1 to 6, it is found that the curable composition, having a storage elastic modulus at 25° C. of a cured product of $1.40\times10^9$ Pa or more, exhibits a better result in the accuracy of the article, as compared with the curable composition, having a storage elastic modulus at 25° C. of a cured product of less than $1.40\times10^9$ Pa. This result indicates that the accuracy of the article can be improved by increasing the storage elastic modulus at 25° C. of a cured product.

It is also found that the curable composition of Example 1, not including a difunctional monomer, exhibits an inferior result in the accuracy of the article among the curable compositions of the Examples including a difunctional monomer, even if a storage elastic modulus at 25° C. of a cured product is $1.40\times10^9$ Pa or more. This result indicates that the accuracy of the article can be improved by including a difunctional monomer.

It is also found that the curable composition of Example 6, including TPO as a photopolymerization initiator, exhibits a better result in the accuracy of the article than the curable composition of Example 8, including 379 as a photopolymerization initiator. This result indicates that the accuracy of the article can be improved by using TPO as a photopolymerization initiator.

From the results shown in Tables 1 to 6, when the curable composition includes a thermoplastic component, it is found that the curable composition tends to exhibit a better result in the evaluation of the cast by having the minimum value of the storage elastic modulus, in a range of from 25° C. to 300° C., of a cured product of not greater than $5.45\times10^6$ Pa.

Further, when the curable composition includes an alcohol or an alcohol derivative, or a (meth)acrylic monomer having a Tg, in a state of a cured product, of not greater than 60° C., it is found that the curable composition tends to exhibit a better result in the evaluation of the cast by having the minimum value of the storage elastic modulus, in a range of from 25° C. to 300° C., of a cured product of not greater than $8.00\times10^6$ Pa.

In view of the above, it is found that the accuracy of the cast can be improved by lowering the minimum value of the storage elastic modulus, in a range of from 25° C. to 300° C., of a cured product of the curable composition.

<Evaluation of Cast (2)>

The casts obtained for the evaluation of cast as mentioned above in Examples 6, 50 and 38 were sprayed with a spray for 3D scanner (3-D ANTI GLARE SPRAY, Helling) and dried. Thereafter, the shape of the cast was converted to 3D data using a 3D scanner (CARA DS SCAN 3.2, Kulzer GmbH). Using the position alignment function of the 3D data editing software (GEOMAGIC DESIGN X, 3D Systems), the difference between the 3D data of the cast and the 3D data of the shape shown in FIG. 1 was calculated as the standard deviation. The results are shown in Table 7.

TABLE 7

| | Example 6 | Example 50 | Example 78 |
|---|---|---|---|
| Standard deviation (μm) | 67.3 | 49.3 | 78.5 |

The curable compositions of Examples 6, 50 and 78 are the same in that the curable compositions include isobornyl acrylate and dimethylol-tricyclodecan diacrylate, as a photopolymerizable component, but are different in that the curable composition of Example 6 includes a thermoplastic component (i.e., a hydrocarbon polymer), the curable composition of Example 50 includes an alcohol (i.e., polyalkylene glycol), and the curable composition of Example 78 includes 2-hydroxyethyl acrylate having a Tg, in a state of a cured product, of not greater than 60° C. (i.e., −15° C.) as a photopolylmerizable component.

As shown in Table 7, Example 50 exhibits the smallest standard deviation. This result indicates that the curable composition that includes an alcohol or an alcohol derivative exhibits a better accuracy of a cast, as compared with the curable composition that includes a thermoplastic component or a monofunctional monomer having a low Tg of a cured product.

The invention claimed is:

1. A curable composition for stereolithography, comprising a photopolymerizable component and a photopolymerization initiator, wherein an entirety of a single cured product of the curable composition has a minimum value of a storage elastic modulus, in a range of from 75° C. to 200° C., of not greater than $1.20\times10^7$ Pa, and has a storage elastic modulus, at 25° C., of $40\times10^9$ Pa or more, and the photopolymerizable component comprises a difunctional (meth) acrylic monomer.

2. The curable composition for stereolithography according to claim 1, comprising a (meth)acryloyl group at a content of from $1.0\times10^{-3}$ mol/g to $6.5\times10^{-3}$ mol/g.

3. The curable composition for stereolithography according to claim 1, wherein the photopolymerizable component comprises a (meth)acrylic monomer having an alicyclic structure.

4. The curable composition for stereolithography according to claim 1, wherein the photopolymerizable component comprises a (meth)acrylic monomer having a glass transition temperature (Tg), in a state of a cured product, of not greater than 60° C.

5. The curable composition for stereolithography according to claim 1, wherein the photopolymerizable component further comprises a monofunctional (meth)acrylic monomer.

6. The curable composition for stereolithography according to claim 5, wherein the monofunctional (meth)acrylic monomer comprises a monofunctional (meth)acrylic monomer having an alicyclic structure.

7. The curable composition for stereolithography according to claim 1, wherein the photopolymerizable component comprises a monofunctional (meth)acrylic monomer having a glass transition temperature (Tg), in a state of a cured product, of greater than 60° C., and having an alicyclic structure.

8. The curable composition for stereolithography according to claim 5, and wherein a mass ratio of the monofunctional (meth)acrylic monomer to the difunctional (meth) acrylic monomer is from 1:0.1 to 1:0.8.

9. The curable composition for stereolithography according to claim 1, wherein the photopolymerizable component further comprises a monofunctional (meth)acrylic monomer having an alicyclic structure, and the curable composition comprises a polyalkylene glycol.

10. The curable composition for stereolithography according to claim 1, further comprising an alcohol or an alcohol derivative.

11. The curable composition for stereolithography according to claim 10, wherein the alcohol or the alcohol derivative comprises a compound having a structure represented by the following Formula (3):

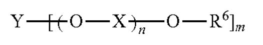

(3)

wherein, in Formula (3), $R^6$ represents a hydrogen atom or a hydrocarbon group of 1 to 20 carbon atoms that may have a substituent; X represents a divalent hydrocarbon group of 1 to 6 carbon atoms; Y represents a hydrocarbon group with a valency of m of 1 to 20 carbon atoms; n represents an integer of 0 to 300; m represents an integer of 1 to 8; when the number of X is two or more, the two or more of X may be the same as or different from each other; and when the number of Re is two or more, the two or more of $R^6$ may be the same as or different from each other.

12. The curable composition for stereolithography according to claim 10, wherein a content of the alcohol or the alcohol derivative with respect to 100 parts by mass of the curable composition is from 5 parts by mass to less than 60 parts by mass.

13. The curable composition for stereolithography according to claim 1, comprising a thermoplastic component.

14. The curable composition for stereolithography according to claim 13, wherein the thermoplastic component comprises a hydrocarbon polymer.

15. The curable composition for stereolithography according to claim 13, wherein the content of a (meth) acryloyl group is from $1.0\times10^{-3}$ mol/g to $5.1\times10^{-3}$ mol/g.

16. An evaporative pattern, comprising a cured product of the curable composition for stereolithography according to claim 1.

17. A method of producing a three-dimensional article, the method comprising:

a process of disposing a material for the three-dimensional article around a cured product, which is obtained from the curable composition for stereolithography according to claim 1; and a process of eliminating the cured product by heating.

* * * * *